United States Patent
Chang et al.

(10) Patent No.: US 11,310,813 B2
(45) Date of Patent: Apr. 19, 2022

(54) MAXIMUM CHANNEL OCCUPANCY TIME SHARING AND CO-EXISTENCE

(71) Applicant: Apple Inc., Cupertino, CA (US)

(72) Inventors: Wenting Chang, Beijing (CN); Jeongho Jeon, San Jose, CA (US); Huaning Niu, San Jose, CA (US); Salvatore Talarico, Sunnyvale, CA (US); Qiaoyang Ye, Fremont, CA (US); Jinyu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/490,260

(22) PCT Filed: Apr. 2, 2018

(86) PCT No.: PCT/US2018/025745
§ 371 (c)(1),
(2) Date: Aug. 30, 2019

(87) PCT Pub. No.: WO2018/184022
PCT Pub. Date: Oct. 4, 2018

(65) Prior Publication Data
US 2020/0029349 A1 Jan. 23, 2020

Related U.S. Application Data

(60) Provisional application No. 62/553,610, filed on Sep. 1, 2017, provisional application No. 62/480,099, filed on Mar. 31, 2017.

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0044* (2013.01); *H04L 5/0053* (2013.01);
(Continued)

(58) Field of Classification Search
CPC ......... H04W 72/1268; H04W 72/0446; H04W 72/1289; H04L 5/0044; H04L 5/0053;
(Continued)

(56) References Cited

U.S. PATENT DOCUMENTS

2018/0176945 A1* 6/2018 Cao ................... H04W 72/1268
2018/0242348 A1* 8/2018 Chendamarai Kannan ................. H04W 72/1268

(Continued)

FOREIGN PATENT DOCUMENTS

| WO | 2018071853 | 4/2018 |
| WO | 2018075745 | 4/2018 |
| WO | 2018106911 | 6/2018 |

OTHER PUBLICATIONS

International Search Report and Written Opinion for PCT Application No. PCT/US18/25745, dated Sep. 11, 2018.
(Continued)

*Primary Examiner* — Christopher R Crompton
(74) *Attorney, Agent, or Firm* — Sterne, Kessler, Goldstein & Fox P.L.L.C.

(57) ABSTRACT

Described is an apparatus of an Evolved Node-B (eNB) operable to communicate with a User Equipment (UE) on a wireless network. The apparatus may comprise a first circuitry, a second circuitry, and a third circuitry. The first circuitry may be operable to process one or more configuration transmissions from the eNB carrying one or more parameters for Grantless Uplink (GUL) transmission. The second circuitry may be operable to determine one or more GUL subframes of an acquired Maximum Channel Occu-
(Continued)

pancy Time (MCOT) on time-domain resources allocated for GUL transmission from the UE. The third circuitry may be operable to generate a GUL transmission during the one or more GUL subframes of the acquired MCOT in accordance with the one or more parameters for GUL transmission.

23 Claims, 12 Drawing Sheets

(51) Int. Cl.
  *H04W 52/02*   (2009.01)
  *H04W 72/04*   (2009.01)
(52) U.S. Cl.
  CPC .......... *H04L 5/0076* (2013.01); *H04L 5/0082* (2013.01); *H04L 5/0096* (2013.01); *H04W 52/0216* (2013.01); *H04W 72/0446* (2013.01); *H04W 72/1289* (2013.01)
(58) Field of Classification Search
  CPC ... H04L 5/0076; H04L 5/0096; H04L 5/0082; H04L 52/0216

USPC ......................................................... 370/329
See application file for complete search history.

(56) References Cited

U.S. PATENT DOCUMENTS

| | | | | |
|---|---|---|---|---|
| 2019/0342037 | A1* | 11/2019 | Karaki | .................. H04W 16/14 |
| 2020/0008229 | A1* | 1/2020 | Li | .......................... H04L 5/0064 |
| 2020/0213043 | A1* | 7/2020 | Hooli | .................... H04L 1/1896 |

OTHER PUBLICATIONS

Ericsson, "On Performance of UL Channel Access Procedures", 3GPP Draft; R1-165158; RAN WG1; Nanjing, China, May 2016.
NTT DoCoMo, et al., "Discussion on affinity for unlicensed spectrum access in 5G new radio", 3GPP Draft; R1-165182; RAN WG1; Nanjing, China; May 2016.
International Preliminary Report on Patentability directed to related International Patent Application No. PCT/US2018/025745, dated Oct. 1, 2019; 13 pages.

\* cited by examiner

MAXIMUM CHANNEL OCCUPANCY TIME SHARING AND CO-EXISTENCE

CLAIM OF PRIORITY

This Application is a National Stage Entry of, and claims priority to, PCT Application No. PCT/US18/25745, filed on Apr. 2, 2018 and titled "MAXIMUM CHANNEL OCCUPANCY TIME SHARING AND CO-EXISTENCE", which claims priority under 35 U.S.C. § 119(e) to U.S. Provisional Patent Application Ser. No. 62/480,099 filed Mar. 31, 2017 and entitled "DESIGN AND APPARATUS FOR MAXIMUM CHANNEL OCCUPANCY TIME (MCOT) SHARING AND CO-EXISTENCE," and to U.S. Provisional Patent Application Ser. No. 62/553,610 filed Sep. 1, 2017 and entitled "DESIGN AND APPARATUS FOR CHANNEL OCCUPANCY TIME SHARING INDICATION AND UPLINK POWER CONTROL FOR GRANTLESS UPLINK (GUL)," which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system. Next-generation wireless cellular communication systems may provide support for higher bandwidths in part by using unlicensed spectrum

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
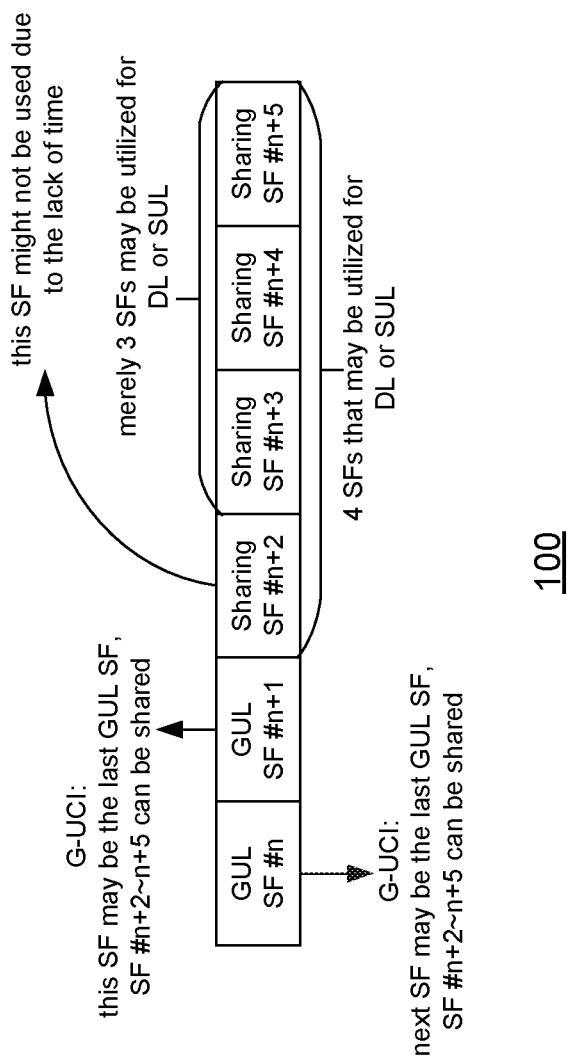
FIG. 1 illustrates a scenario of Grantless Uplink (GUL) subframes and shared subframes, in accordance with some embodiments of the disclosure.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

Due to the popularity of mobile devices and smart devices, the widespread adoption of wireless broadband has resulted in significant growth in the volume of mobile data traffic and has radically impacted system requirements, sometimes in divergent ways. For example, while it may be important to lower complexity, elongate battery life, and support highly mobility and service continuity of devices, it may also be important to increase data rates and bandwidths and lower latencies to support modern applications.

To meet the needs of future wireless networks, various physical layer techniques have been introduced (e.g, Multiple Input Multiple Output (MIMO) techniques, enhanced Inter-Cell Interference Coordination (ICIC) designs, coordinated multi-point designs, and so on). An increasing interest has also arisen in operating cellular networks in unlicensed spectrum to ameliorate the scarcity of licensed spectrum in low frequency bands, with the aim to further improve data rates. One enhancement for LTE in 3GPP Release 13 has been to enable operation in unlicensed spectrum via Licensed-Assisted Access (LAA), which may expand a system bandwidth by utilizing a flexible carrier aggregation (CA) framework introduced by the LTE-Advanced system. Enhanced operation of LTE systems in unlicensed spectrum is also expected in future releases, as well as in 5G systems.

Potential LTE operations in unlicensed spectrum may include (but not be limited to) LTE system operation in the unlicensed spectrum via Dual Connectivity (DC) (e.g., DC-based LAA), as well as LTE-based technology operating solely in unlicensed spectrum without relying upon an "anchor" in licensed spectrum (such as in MulteFire™ technology by MulteFire Alliance of Fremont Calif., USA).

Standalone LTE operation in unlicensed spectrum may combine performance benefits of LTE technology with a relative simplicity of Wi-Fi®-like deployments. (Wi-Fi® is a registered trademark of the Wi-Fi Alliance of Austin, Tex., USA.) Standalone LTE operation may accordingly be an advantageous technology in meeting demands of ever-increasing wireless traffic.

Since Uplink (UL) performance may be limited in enhanced Licensed-Assisted Access (eLAA) due to both Evolved Node-B (eNB) side Listen-Before-Talk (LBT) procedures and UE-side LBT procedures, Grantless UL transmission may be advantageous.

In various embodiments, Grantless Uplink (GUL) transmission may be initialized by a User Equipment (UE), so not every subframe may be available for GUL transmission to alleviate the impact to legacy performance. In various embodiments, the Maximum Channel Occupancy Time (MCOT) of GUL may be not contiguous, and calculation of MCOT may then become a problem.

Meanwhile, in order to enable fast Hybrid Automatic Repeat Request (HARQ) procedure and UL/Downlink (DL) performance, an MCOT acquired by UE may be shared with an eNB to transmit a DL subframe to any active UE and/or schedule a UL subframe to a given GUL UE. For example, a UE may decide a Category 4 (Cat-4) priority and/or MCOT length by itself according to a traffic type. This may impact limit a gain for GUL, since the eNB may lack control.

Accordingly, discussed herein are mechanisms and methods for enabling more flexible MCOT sharing. Some embodiments may pertain to MCOT accounting in co-existence scenarios. Some embodiments may pertain to GUL subframe and/or shared subframe indication. Some embodiments may pertain to GUL subframe constraints.

In various embodiments, an MCOT acquired by a UE for GUL transmission may be shared with an eNB in order to enable fast HARQ procedures, and/or to improve DL and/or UL performance. The eNB may be disposed to having information pertaining to MCOT and/or GUL burst length in order to determine the subframes available for sharing.

In some embodiments, MCOT related information may be contained in Grantless Uplink Control Information (G-UCI), such as: whether or not to share (which may be left up to an eNB); remaining MCOT time (which may span, for example, up to 10 states) and/or a 1-bit flag to indicate an ending GUL subframe.

Various methods may indicate such MCOT related information. However, it may take a certain amount of time for a serving eNB to decode pertinent G-UCI information (e.g., 1 millisecond (ms) of processing delay), which may mean that even if a next subframe is allowed to be shared, it may be too late to schedule when the eNB discovers that it could be shared.

For example, a GUL UE may inform an eNB in a subframe (SF) N that this subframe is the last GUL subframe, and there are 3 sharing subframes left in the MCOT (e.g., SF N+1 through SF N+3). However, the eNB may be disposed to having time to decode the G-UCI, and SF N+1 may be wasted. Considering processing delays for G-UCI, such an indication for MCOT and GUL burst may advantageously be optimized, and payload bits for MCOT sharing may advantageously be reduced.

Since Transmit Power Control (TPC) commands (which influence UL power) may be included in Grantless Downlink Control Information (G-DCI), the introduction of GUL transmission may raise new problems pertaining to UL power control.

FIG. 1 illustrates a scenario of GUL subframes and shared subframes, in accordance with some embodiments of the disclosure. A scenario 100 may comprise a next-to-last subframe of GUL transmission, followed by a last subframe of GUL transmission, followed by a number of subframes of shared transmission (which may be utilized for DL or SUL), the first of which might not be used due to lack of time).

The indication of MCOT related information may consider G-UCI processing delay at an eNB side, including when to transmit G-UCI and how to account for a remaining MCOT length. Accordingly, discussed herein are mechanisms and methods for indicating MCOT related information in G-UCI. Some embodiments may pertain to separate indication of a remaining MCOT and a GUL ending boundary. Some embodiments may pertain to joint indication of the remaining MCOT and the GUL ending boundary.

Also discussed herein are mechanisms and methods for controlling UL Transmission (Tx) power for GUL. Some embodiments may pertain to separate GUL power control similar to SUL power control. Some embodiments may pertain to unified GUL power control and SUL power control.

GUL-subframe and shared-subframe indication may be done in a variety of ways. Some embodiments may pertain to separate indication, and may utilize a number N1 of bits indicating remaining GUL subframes and a number N2 of bits indicating shared subframes. Some embodiments may pertain to joint indication, and may utilize a number of bits for which various values indicate various combinations of remaining GUL subframes and shared subframes. Some embodiments may pertain to an N-bit shared subframe number and a 1-bit flag indicating whether a current subframe is the last GUL subframe.

In various embodiments, an indication of an amount of remaining MCOT (e.g., a number of remaining subframes) might not take Uplink Control Information (UCI) processing delays into consideration. Therefore, such indications may be disposed to deliver information pertaining to a subframe during which an eNB decodes UCI, rather than a subframe containing the UCI. For example, if the G-UCI is transmitted in a subframe N, and the eNB can decode the G-UCI at a subframe N+1, then the G-UCI in subframe N should indicate whether the subframe N+1 is the last GUL subframe, and/or how many subframes may be left for sharing starting from subframe N+2.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable eNB, a next-generation or 5G capable eNB, an Access Point (AP), and/or another base station for a wireless communication system. The term "gNB" may refer to a 5G-capable or NR-capable eNB. For purposes of the present disclosure, the term "UE" may refer to a legacy LTE capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

A variety of embodiments may pertain to enabling more flexible MCOT sharing. Some embodiments may pertain to MCOT accounting in co-existence scenarios. In some scenarios, a GUL MCOT may overlap with Discovery Reference Signals (DRS), and in some scenarios, a GUL MCOT may be overlapped with a Physical Random Access Channel (PRACH). In order to not impact legacy performance, in some embodiments, such subframes might be prohibited for GUL transmission.

Figure 2:
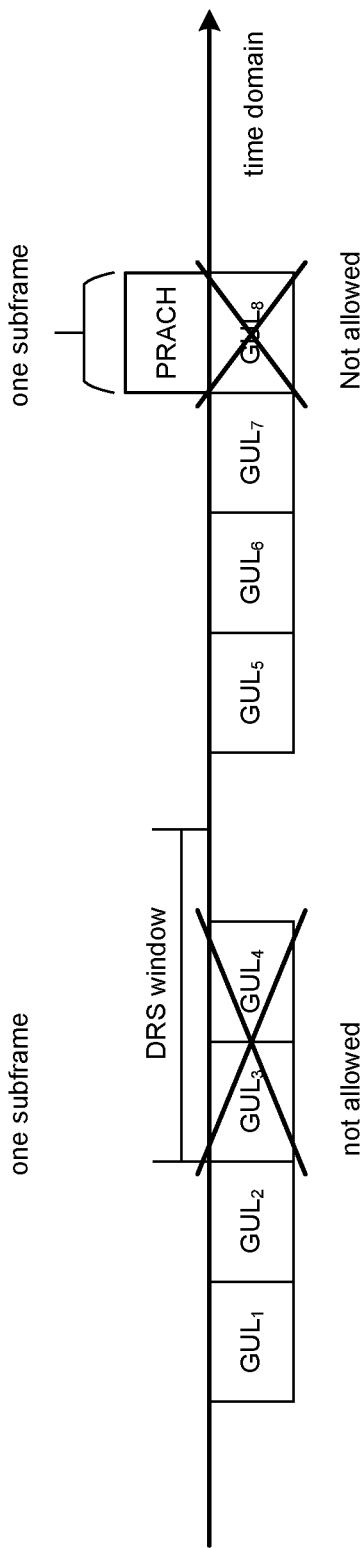
FIG. 2 illustrates a scenario of co-existence for GUL transmission, in accordance with some embodiments of the disclosure.

FIG. 2 illustrates a scenario of co-existence for GUL transmission, in accordance with some embodiments of the disclosure. A scenario 200 may comprise various GUL subframes, and various subframes that might not be used for GUL due to overlapping with, e.g., a DRS window, or a PRACH.

Some embodiments may pertain to MCOT accounting in general. In some embodiments, when a GUL MCOT overlaps with the reserved subframes, a UE might not start a GUL transmission. For example, as depicted in FIG. 2, GUL may be transmitted after a DRS subframe (e.g., a subframe within a DRS window), and before and/or after a PRACH subframe.

For some embodiments, a UE may trigger a GUL at any available subframes, while for overlapped subframe (e.g., subframes overlapped with reserved subframes), GUL might not be transmitted. Remaining GUL subframes may pertain to various options. In accordance with a first option, a UE may continue to transmit after the reserved subframes, until an MCOT-length of GUL subframes has finished. In accordance with a second option, a UE may transmit GUL before the reserved subframes, and remaining GUL subframes may be shared with an eNB. In accordance with a third option, a UE may detect the presence of DRS, and may continue GUL transmission within a DRS window after it detects DRS.

In some embodiments, an eNB may configure UE by higher-layer signaling (e.g., configuring whether and/or how to perform GUL transmission after reserved subframes).

Some embodiments may pertain to GUL subframe and/or shared subframe indication. In some embodiments, instead of a burst length and MCOT indication, a set of remaining subframes for MCOT may be indicated. For some embodiments, if a first subframe is missed, an eNB might not derive correct subframes for MCOT sharing. Accordingly, various options may be utilized to assist an eNB in determining correct subframes for MCOT sharing. (Note that in various embodiments, when accounting for remaining GUL subframes and/or shared subframes, an MCOT may be calculated in accordance with various methods proposed herein.)

In a first option for assisting an eNB in determining correct subframes for MCOT sharing, a number N1 of bits may indicate a number of GUL subframes before the ending of a burst, and a number N2 of bits may indicate a number of subframes that may be shared. For example, N1 and N2 may each be three bits, and may be interpreted in accordance with Table 1 below. (In various embodiments, N1 and N2 may be interpreted separately.)

TABLE 1 an example of MCOT sharing indicators

| Indicator | meaning of $N_1$ bits | meaning of $N_2$ bits |
| --- | --- | --- |
| "000" | no subsequent GUL subframe | no subframe may be shared |
| "001" | 1 remaining GUL subframe | 1 subframe may be shared |
| "010" | 2 remaining GUL subframes | 2 subframes may be shared |
| "011" | 3 remaining GUL subframes | 3 subframes may be shared |
| "100" | 4 remaining GUL subframes | 4 subframes may be shared |
| "101" | 5 remaining GUL subframes | 5 subframes may be shared |
| "110" | 6 remaining GUL subframes | 6 subframes may be shared |
| "111" | 7 remaining GUL subframes | 7 subframes may be shared |

In a second option for assisting an eNB in determining correct subframes for MCOT sharing, a joint indication may be utilized to jointly indicate how many GUL subframes are left, and how many subframes may be utilized for sharing, such as in Table 2 and Table 3 below.

TABLE 2 an example of joint indication of GUL length and shared length, with 8 ms MCOT

| indicator | subframe indication |
| --- | --- |
| "000000"~"000111" (0~7) | no subsequent GUL subframe 0~7 subframes can be shared |
| "001000"~"001110" (8~14) | 1 subsequent GUL subframe 0~6 subframes can be shared |
| "001111"~"010100" (15~20) | 2 subsequent GUL subframe 0~5 subframes can be shared |
| "010101"~"011001" (21~25) | 3 subsequent GUL subframe 0~4 subframes can be shared |
| "011010"~"011101" (26~29) | 4 subsequent GUL subframe 0~3 subframes can be shared |

TABLE 2-continued an example of joint indication of GUL length and shared length, with 8 ms MCOT

| indicator | subframe indication |
| --- | --- |
| "011110"~"100000" (30~32) | 5 subsequent GUL subframe 0~2 subframes can be shared |
| "100001"~"100010" (33~34) | 6 subsequent GUL subframe 0~1 subframes can be shared |
| "100011" (35) | 7 subsequent GUL subframe 0 subframes can be shared |
| others | reserved |

TABLE 3 an example of joint indication of GUL length and shared length, with 6 ms MCOT

| indicator | subframe indication |
| --- | --- |
| "00000"~"00101" (0~5) | no subsequent GUL subframe 0~5 subframes can be shared |
| "00110"~"01010" (6~10) | 1 subsequent GUL subframe 0~4 subframes can be shared |
| "01011"~"01110" (11~14) | 2 subsequent GUL subframe 0~3 subframes can be shared |
| "01111"~"10001" (15~17) | 3 subsequent GUL subframe 0~2 subframes can be shared |
| "10010"~"10011" (18~19) | 4 subsequent GUL subframe 0~1 subframes can be shared |
| "10100" (20) | 5 subsequent GUL subframe 0 subframes can be shared |
| others | reserved |

In a third option for assisting an eNB in determining correct subframes for MCOT sharing, a 1-bit flag may indicate whether or not a subframe is a last subframe, and N bits may indicate how many subframes may be shared at the end of a GUL subframe.

Some embodiments may pertain to GUL subframe constraints. In some embodiments, a maximum GUL burst length Nmax may be configured by an eNB through higher-layer signaling. A UE may determine an MCOT length by itself, but available subframes for GUL may be restricted to Nmax. In high competition scenarios, a UE may help an eNB to access a channel.

A variety of embodiments may pertain to enabling more flexible MCOT sharing. In various embodiments, the remaining MCOT information may be indicated in G-UCI, including a GUI subframe ending boundary and a remaining MCOT length.

Some embodiments may pertain to separate remaining MCOT indication and GUL ending (e.g., GUL ending indication). In some embodiments, a number of bits (e.g., X+1 bits) in a subframe N may be used to indicate MCOT related information. A 1-bit flag may be used to inform whether the current SF (e.g., SF N) and/or the next SF (e.g., SF N+1) is or is not the last GUL subframe. An eNB may then begin to share the MCOT at subframe N+1 and/or subframe N+2. The X bits may then be used to indicate how many subframes are left before the end of MCOT.

In some embodiments, when calculating the remaining MCOT subframe, the calculation may from either N+1 or N+2. Through monitoring the 1-bit flag, an eNB may determine a last GUL subframe, and a first shared subframe may then also be determined. Whether a 1-bit flag in subframe N should be used to indicate the current subframe (SF N) or the next subframe (SF N+1) may depend on the decoding delay at the eNB side. If the eNB can decode G-UCI before SF N+1 so that it may utilize the next subframe if it is allowed to be shared, then the 1-bit flag may indicate whether this subframe (e.g., SF N) is or is not the last GUL subframe. Otherwise, this flag may be used to indicate whether the next subframe (e.g., SF N +1) is or is not the last GUL subframe.

In some embodiments, an eNB may share an MCOT based on a slot unit. For example, an eNB may decode G-UCI within the first slot of a next subframe, then share the remaining MCOT from the second slot.

Alternatively, in some embodiments, a 1-bit indicator in (X+1) bits of MCOT information signaling at subframe N may be used to inform whether a next subframe (e.g., SF N+1) and/or a subframe following the next subframe (e.g., SF N+2) may be shared. Similarly, when calculating a remaining MCOT subframe, it may start from either N+1 or N+2, and whether a 1-bit flag in subframe N should be used to instruct subframe N+1 or subframe N+2 may depend on decoding delay at the eNB side.

Figure 3:
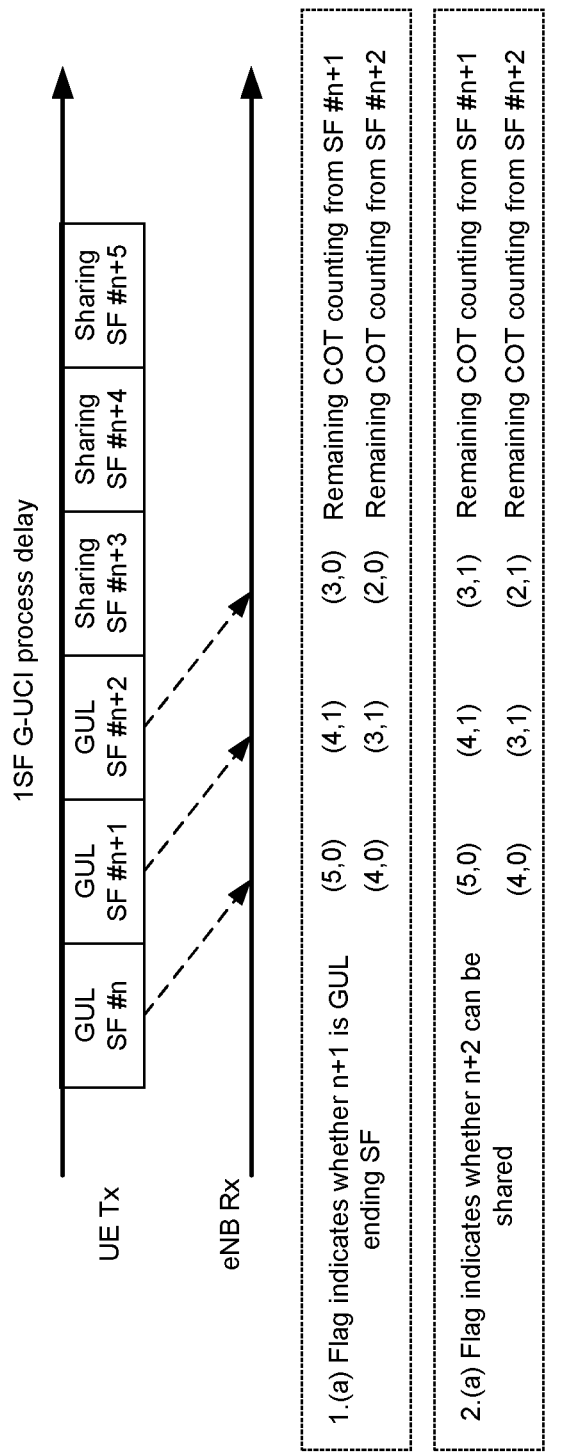
FIG. 3 illustrates a scenario of Maximum Channel Occupancy Time (MCOT) information indicators, in accordance with some embodiments of the disclosure.

FIG. 3 illustrates a scenario of MCOT information indicators, in accordance with some embodiments of the disclosure. A scenario 300 may comprise various GUL transmissions sent from a UE to an eNB. In some embodiments, a flag may indicate whether a subframe N+1 is a GUL ending subframe. In some embodiments, a flag may indicate whether a subframe N+2 may be shared. FIG. 3 may accordingly depict an (X+1) bit MCOT information indicator.

In some embodiments, a most significant bit may be used to indicate whether a next SF is a last GUL SF, and (after accounting for a G-UCI processing delay) whether a subsequent SF can be shared or not, while one or more least significant bits may be used to indicate a duration of an MCOT starting from this. For some embodiments, a least significant bit may be used to indicate a last GUL SF, and (after accounting for a G-UCI processing delay) whether a subsequent SF can be shared or not, while one or more remaining bits may be used to indicate a duration of an MCOT starting from it.

Some embodiments may pertain to joint remaining-MCOT indication and GUL ending indication. In some embodiments, the X-bit remaining MCOT length in subframe N may be accounted for either from subframe N+1 or subframe N+2. Similar to a 1-bit flag, the accounting starting subframe should depend on the G-UCI processing delay. For some embodiments, a remaining MCOT (e.g., subframes of a remaining MCOT) may be jointly utilized to indicate MCOT sharing.

In some embodiments, one or more states (e.g., a value of "1111", or a value of "0000") may be reserved by an eNB to indicate no meaning of remaining MCOT and sharing. For example, if a G-UCI is transmitted in a subframe N, and an eNB decodes the G-UCI before the end of subframe N+1, it may indicate that the remaining MCOT starts from subframe N+2, as well as whether subframe N+1 is the last subframe, and subframe N+2 may be shared (or not).

Figure 4:
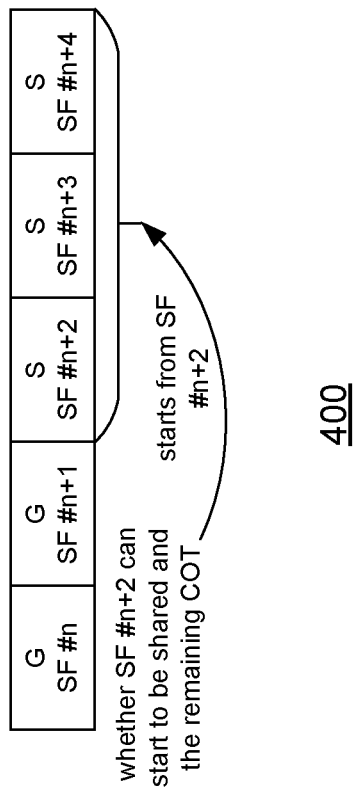
FIG. 4 illustrates a scenario of GUL subframes and shared subframes, in accordance with some embodiments of the disclosure.

FIG. 4 illustrates a scenario of GUL subframes and shared subframes, in accordance with some embodiments of the disclosure. A scenario 400 may comprise various GUL-transmission subframes and various shared subframes.

Table 4 below provides an example of joint indication when G-UCI cannot be decoded immediately. (Note that this is merely an example, and various associations between the indicator and the meaning of the indicator may be possible.)

TABLE 4

Joint indication when G-UCI cannot be decoded immediately

| indicator | meaning |
|---|---|
| "0000" | the remaining MCOT is 8 subframes and the n + 2 subframe can be shared |
| "0001" | the remaining MCOT is 7 subframes and the n + 2 subframe can be shared |
| "0010" | the remaining MCOT is 6 subframes and the n + 2 subframe can be shared |
| "0011" | the remaining MCOT is 5 subframes and the n + 2 subframe can be shared |
| "0100" | the remaining MCOT is 4 subframes and the n + 2 subframe can be shared |
| "0101" | the remaining MCOT is 3 subframes and the n + 2 subframe can be shared |
| "0110" | the remaining MCOT is 2 subframes and the n + 2 subframe can be shared |
| "0111" | the remaining MCOT is 1 subframe and the n + 2 subframe can be shared |
| "1000" | the remaining MCOT is 8 subframes and the n + 2 subframe cannot be shared |
| "1001" | the remaining MCOT is 7 subframes and the n + 2 subframe cannot be shared |
| "1010" | the remaining MCOT is 6 subframes and the n + 2 subframe cannot be shared |
| "1011" | the remaining MCOT is 5 subframes and the n + 2 subframe cannot be shared |
| "1100" | the remaining MCOT is 4 subframes and the n + 2 subframe cannot be shared |
| "1101" | the remaining MCOT is 3 subframes and the n + 2 subframe cannot be shared |
| "1110" | the remaining MCOT is 2 subframes and the n + 2 subframe cannot be shared |
| "1111" | no meaning |

Due to restricted bit lengths for remaining MCOT indication, an indication that "the remaining MCOT is 1 subframe, and the N+2 subframe cannot be shared" ismay be omitted and replaced as "no meaning," as in the example above. Meanwhile, "no meaning" may obtain the same effect of 1 remaining MCOT that cannot be shared. In embodiments in which there may be merely one subframe to be shared, it may not cause undesirable performance loss, even if this last subframe is not utilized. In some embodiments, considering indication payload and/or performance gain, it may be preferable to place one of following two cases into a reserved state.

A first case may be when "a remaining MCOT is 1 subframe, and an N+2 subframe cannot be shared." In such embodiments, a first value (e.g., a value of "1111") may indicate "no MCOT sharing," and a second value (e.g., a value of "0111") may indicate "the remaining MCOT is 1 subframe, and the N+2 subframe may be shared," as in the above table.

A second case may be when "a remaining MCOT is 1 subframe, and an N+2 subframe can be shared". In such embodiments, a first value (e.g., a value of "1111") may indicate "the remaining MCOT is 1 subframe, and the N+2 subframe cannot be shared," and a second value (e.g., a value of "0111") may indicate "no MCOT sharing."

In another example, G-UCI may be transmitted in a subframe N, and an eNB may have the capability to decode it at the end of subframe N. The remaining MCOT may be accounted for starting from N+1.

Table 5 below provides an example of a joint indication of when G-UCE may be decoded immediately. Note that in various embodiments, the association between the indicator and the meaning may be changed.

TABLE 5

Joint indication when G-UCI can be decoded immediately

| indicator | meaning |
|---|---|
| "0000" | the remaining MCOT is 9 subframes and the n + 1 subframe cannot be shared |
| "0001" | the remaining MCOT is 8 subframes and the n + 1 subframe cannot be shared |
| "0010" | the remaining MCOT is 7 subframes and the n + 1 subframe cannot be shared |
| "0011" | the remaining MCOT is 6 subframes and the n + 1 subframe cannot be shared |
| "0100" | the remaining MCOT is 5 subframes and the n + 1 subframe cannot be shared |
| "0101" | the remaining MCOT is 4 subframes and the n + 1 subframe cannot be shared |
| "0110" | the remaining MCOT is 3 subframes and the n + 1 subframe cannot be shared |
| "0111" | the remaining MCOT is 2 subframe and the n + 1 subframe cannot be shared |
| "1000" | the remaining MCOT is 9 subframes and the n + 1 subframe can be shared |
| "1001" | the remaining MCOT is 8 subframes and the n + 1 subframe can be shared |
| "1010" | the remaining MCOT is 7 subframes and the n + 1 subframe can be shared |
| "1011" | the remaining MCOT is 6 subframes and the n + 1 subframe can be shared |
| "1100" | the remaining MCOT is 5 subframes and the n + 1 subframe can be shared |
| "1101" | the remaining MCOT is 4 subframes and the n + 1 subframe can be shared |
| "1110" | the remaining MCOT is 3 subframes and the n + 1 subframe can be shared |
| "1111" | no meaning |

In various embodiments, the reserved state could be a different value (e.g., "0111" or "1111"). In some embodiments, a first value (e.g., a value of "0111") may indicate "No meaning," and a second value (e.g., a value of "1111") may indicate that "the remaining MCOT is 2 subframes, and the N+1 subframe can be shared." Then, the indication that "the remaining MCOT is 2 subframes, and the N+1 subframe cannot be shared" may be omitted.

In some embodiments, a first value (e.g, a value of "0111") may indicate that "the remaining MCOT is 2 subframes, and the N+1 subframe cannot be shared," and a second value (e.g., a value of "1111") may indicate "No MCOT sharing" (as illustrated, for example, in Table 5). Then, "the remaining MCOT may be 2 subframes, and the N+1 subframe may be shared" may be omitted.

In some embodiments, the MCOT information in a G-UCI at a subframe N may be utilized to indicate Channel Occupancy Time (COT) information starting from either an N+1th subframe or an N+2th subframe. Table 6 below provides one example of a G-UCI reinterpretation.

TABLE 6 an example of G-UCI reinterpretation

| indicator in subframe n | meaning |
|---|---|
| "0000" | The n + 1 subframe can be shared, the remaining COT (starting from n + 1) is 8 subframes |
| "0001" | The n + 1 subframe can be shared, the remaining COT (starting from n + 1) is 7 subframes |
| "0010" | The n + 1 subframe can be shared, the remaining COT (starting from n + 1) is 6 subframes |
| "0011" | The n + 1 subframe can be shared, the remaining COT (starting from n + 1) is 5 subframes |
| "0100" | The n + 1 subframe can be shared, the remaining COT (starting from n + 1) is 4 subframes |
| "0101" | The n + 1 subframe can be shared, the remaining COT (starting from n + 1) is 3 subframes |
| "0110" | The n + 1 subframe can be shared, the remaining COT (starting from n + 1) is 2 subframes |
| "1000" | The n + 2 subframe can be shared, the remaining COT (starting from n + 2) is 8 subframes |
| "1001" | The n + 2 subframe can be shared, the remaining COT (starting from n + 2) is 7 subframes |
| "1010" | The n + 2 subframe can be shared, the remaining COT (starting from n + 2) is 6 subframes |
| "1011" | The n + 2 subframe can be shared, the remaining COT (starting from n + 2) is 5 subframes |
| "1100" | The n + 2 subframe can be shared, the remaining COT (starting from n + 2) is 4 subframes |
| "1101" | The n + 2 subframe can be shared, the remaining COT (starting from n + 2) is 3 subframes |
| "1110" | The n + 2 subframe can be shared, the remaining COT (starting from n + 2) is 2 subframes |
| "1111/0111" | "reserved" no meaning e.g., eNB can not share the (n + 2)th, (n + 1)th subframes |

In some embodiments, the MCOT information in G-UCI at subframe N may be utilized to indicate COT information starting from either an N+3th subframe or an N+2th subframe. Table 7 below provides one example of a G-UCI reinterpretation.

TABLE 7 an example of G-UCI reinterpretation

| indicator in subframe n | meaning |
|---|---|
| "0000" | the n + 1 subframe can be shared, the remaining COT (starting from n + 3) is 7 subframes |
| "0001" | the n + 1 subframe can be shared, the remaining COT (starting from n + 3) is 6 subframes |
| "0010" | the n + 1 subframe can be shared, the remaining COT (starting from n + 3) is 5 subframes |
| "0011" | the n + 1 subframe can be shared, the remaining COT (starting from n + 3) is 4 subframes |
| "0100" | the n + 1 subframe can be shared, the remaining COT (starting from n + 3) is 3 subframes |
| "0101" | the n + 1 subframe can be shared, the remaining COT (starting from n + 3) is 2 subframes |
| "0110" | the n + 1 subframe can be shared, the remaining COT (starting from n + 3) is 1 subframes |
| "1000" | the n + 2 subframe can be shared, the remaining COT (starting from n + 2) is 8 subframes |
| "1001" | the n + 2 subframe can be shared, the remaining COT (starting from n + 2) is 7 subframes |
| "1010" | the n + 2 subframe can be shared, the remaining COT (starting from n + 2) is 6 subframes |
| "1011" | the n + 2 subframe can be shared, the remaining COT (starting from n + 2) is 5 subframes |
| "1100" | the n + 2 subframe can be shared, the remaining COT (starting from n + 2) is 4 subframes |
| "1101" | the n + 2 subframe can be shared, the remaining COT (starting from n + 2) is 3 subframes |
| "1110" | the n + 2 subframe can be shared, the remaining COT (starting from n + 2) is 2 subframes |
| "1111/0111" | "reserved" no meaning e.g. eNB can not share the (n + 2)th, (n + 3)th subframes |

In some embodiments, the MCOT information in G-UCI at subframe N may be utilized to indicate COT information starting from an N+2th subframe. Table 8 below provides one example of a G-UCI reinterpreteation.

TABLE 8 one example of G-UCI reinterpretation

| indicator in subframe n | meaning |
|---|---|
| "000" | the n + 2 subframe can be shared, the remaining COT (starting from n + 2) is 8 subframes |
| "001" | the n + 2 subframe can be shared, the remaining COT (starting from n + 2) is 7 subframes |
| "010" | the n + 2 subframe can be shared, the remaining COT (starting from n + 2) is 6 subframes |
| "011" | the n + 2 subframe can be shared, the remaining COT (starting from n + 2) is 5 subframes |
| "100" | the n + 2 subframe can be shared, the remaining COT (starting from n + 2) is 4 subframes |
| "101" | the n + 2 subframe can be shared, the remaining COT (starting from n + 2) is 3 subframes |
| "110" | the n + 2 subframe can be shared, the remaining COT (starting from n + 2) is 2 subframes |
| "111" | "reserved" no meaning e.g. eNB can not share the (n + 2)th subframes |

In some embodiments, various numbers of bits may be used in a subframe N to provide information regarding remaining MCOT information. A 1-bit flag may be used to indicate whether a next subframe (e.g., a subframe N+1) may be a last subframe as well as whether subframe N+2 could be shared or not. Two bits may be used to indicate MCOT length via an LBT priority class. Based on that information, an eNB may determine when to share, and how many subframes may be shared.

For some embodiments, an MCOT length and a number of shared subframes may be indicated separately via the following two types. A first type may incorporate a 1-bit flag, 2 bits of MCOT length information (equivalent to LBT priority), and 1 reserved bit. An MCOT length may be indicated via 2 bits of LBT priority class. For a 1-bit flag, a first value (e.g., a value of "0") may mean MCOT length, and a second value (e.g., a value of "1") may mean a shared subframe number (or vice versa).

A second type may incorporate a 1-bit flag and 3 bits of shared subframe number. 3 bits may be used to indicate which subframes (e.g., subframes 0~7) may be shared.

In some embodiments, such methods and mechanisms may employ at two or more GUL subframes to transmit an MCOT length and shared subframe number, respectively. Once an MCOT length and shared subframe length are determined, an eNB may derive a GUL ending boundary.

Figure 5:
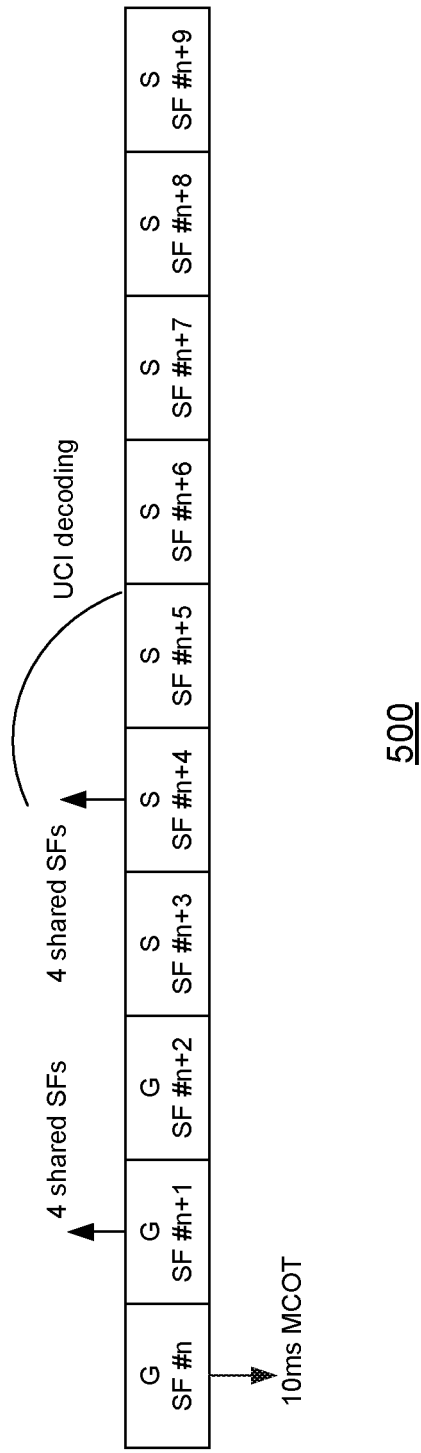
FIG. 5 illustrates a scenario of MCOT length and number-of-shared-subframes indication, in accordance with some embodiments of the disclosure.

FIG. 5 illustrates a scenario of MCOT length and number-of-shared-subframes indication, in accordance with some embodiments of the disclosure. A scenario 500 may comprise an indication of MCOT length and/or shared subframe numbers.

Considering G-UCI processing delays, at least 3 GUL subframes may be employed. A first GUL subframe may transmit an MCOT length, the shared subframe number may be indicated in a second GUL subframe, and the third subframe may be for G-UCI decoding.

In some embodiments, if merely two subframes are used for GUL, a UE may be disposed to inform an eNB in a second subframe (e.g., a subframe N+1) that there are MCOT-3 subframes, starting from a subframe N+3, which may be shared. This may conflict with a scenario of 3 GUL subframes. Therefore, an eNB may perform blind detection in a following subframe (e.g., a subframe N+2) in such scenarious, since a SF N+2 may be used for GUL or, alternatively, left vacant.

Figure 6:
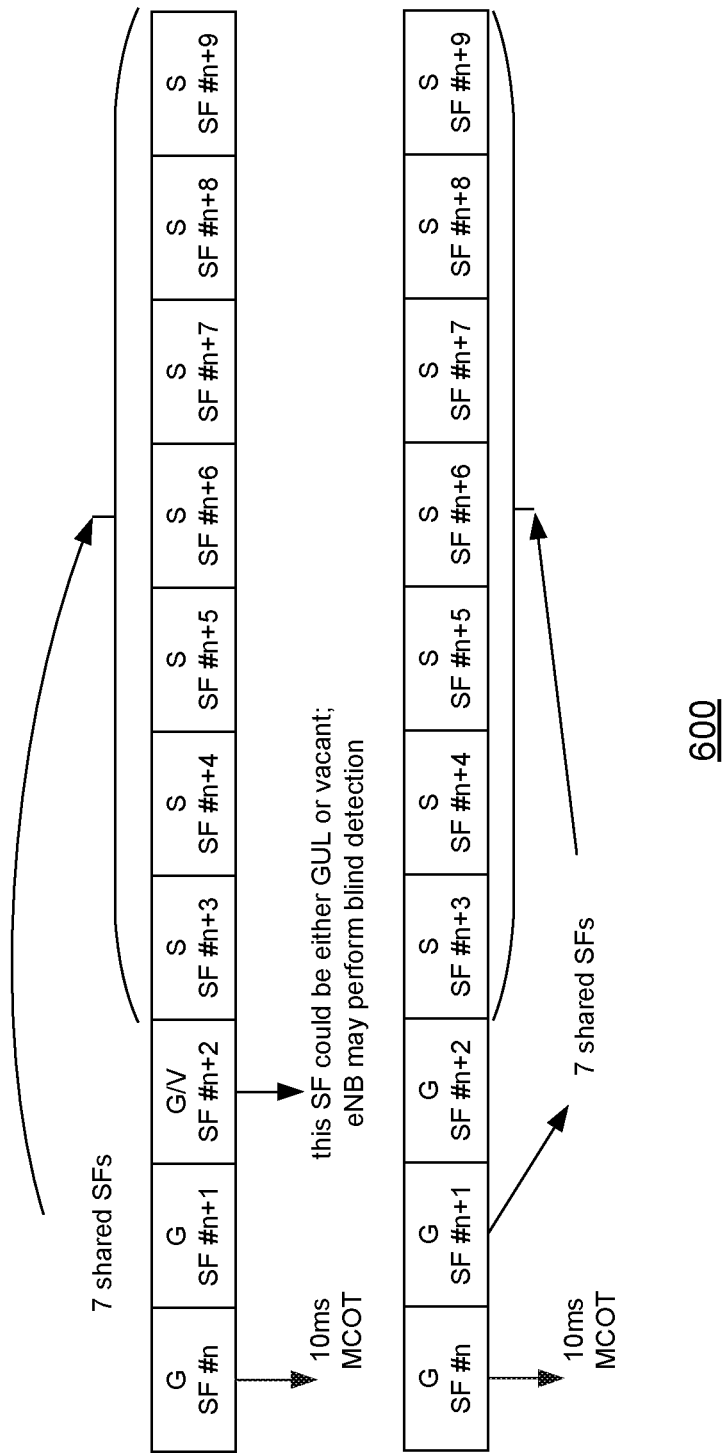
FIG. 6 illustrates a scenario of blind detection, in accordance with some embodiments of the disclosure.

FIG. 6 illustrates a scenario of blind detection, in accordance with some embodiments of the disclosure. A scenario 600 may comprise indications of shared subframes, with or without vacant subframes and/or blind detection.

Some embodiments may pertain to UL power control for GUL. In legacy LTE, UL Tx power of a UE may be a sum of a bandwidth factor, a basic open-loop operating point, and/or a dynamic offset in accordance with the equation:

$$UE\ Tx\ \text{Power} = \underbrace{10\log_{10}M}_{bandwidth\ factor} + \underbrace{P_0 + \alpha \cdot PL}_{basic\ open\text{-}loop\ operating\ point} + \underbrace{\Delta_{TF} + f(\Delta_{TPC})}_{dynamic\ offset}$$

The basic open-loop operating point may be related to $P_0$. The dynamic offset may depend on values for Modulation and Coding Scheme (MCS) and TPC. The parameter $P_0$ may be composed of a Cell-specific parameter (e.g., a parameter "p0-NominalPUSCH-Persistent-SubframeSet2-r12" for Semi-Persistent Scheduling (SPS)) and a UE-specific parameter (e.g., a parameter "p0-UE-PUSCH-Persistent-SubframeSet2-r12" for SPS). The parameter $f(\Delta_{TPC})$, which may be termed a TPC command, may be indicated via Downlink Control Information (DCI), as well as via an adjustment method provided by a higher-layer parameter (e.g., a parameter "Accumulation-enabled").

In some embodiments, an activation of GUL transmission may leave a target UE confused about how to adjust UL power since related TPC commands may also be contained in G-DCI, especially when Scheduled Uplink (SUL) mode-switching incurs. As a result, how to perform UL power control should be clarified after introducing GUL transmission in MF systems.

In some embodiments, separate UL control may be employed for GUL transmission and SUL transmission, and therefore GUL may have an independent Tx power control process without any impact to SUL. When deriving $f(\Delta_{TPC})$, GUL may merely use a TPC in G-DCI, while SUL may use a TPC in DCI. As for an adjustment method of dynamic power offset, a new parameter (e.g., "Accumulation-enabled-mf-grantless") may be introduced in Radio Resource Control (RRC) to decide whether accumulation is enabled for GUL power control, and SUL may use another parameter (e.g., "Accumulation-enabled") to determine the adjustment method. As for $P_0$, a first parameter (e.g., "p0-Nominal-PUSCH-mf-grantless") that may be transmitted in a System Information Block 2 (SIB2) and a second parameter (e.g., "p0-UE-PUSCH-mf-grantless") that may be provided through dedicated RRC may be introduced to indicate Cell-specific $P_0$ and UE-specific $P_0$, respectively. Similarly, the newly-introduced parameters might merely be valid for GUL, and may not affect SUL Tx power.

When adopting a completely separate UL control for GUL, some new parameters may coincide with those of legacy designs. Considering the efficiency of signaling and impact on various specifications, it may be preferred for GUL to have a unified UL power control as in SUL, in which one or more parameters may be shared between the two modes. In some embodiments of unified GUL power control, a unified $P_0$ and a unified TPC may be adopted for GUL, where $P_0$ related parameters (including, e.g., a parameter "p0-NominalPUSCH" and a parameter "p0-UE-PUSCH") and an adjustment method parameter (e.g., "Accumulation-enabled") may be common for both GUL and SUL, so that the introduction of similar parameters may advantageously be avoided.

In accordance with a first option for performing unified TPC, for both GUL and SUL, merely the TPC commands in DCI may be valid to derive $f(\Delta_{TPC})$, and the TPC commands in G-DCI may be ignored.

In accordance with a second option for performing unified TPC, TPC commands in DCI may be valid for both GUL and SUL, while TPC commands in G-DCI may be valid merely for GUL. For example, if a SUL UE with a Tx power p1 switches to GUL, then the Tx power could reuse p1 until it receives power adjust control information (e.g., adjusting to p2=p1+Δ) according to TPC commands in G-DCI. When switching back to SUL, it may then transmit with power p1 rather than p2, since the TPC commands in G-DCI may not have control over SUL Tx power.

In accordance with a third option for performing unified TPC, whether in DCI or G-DCI, TPC commands may be valid for both GUL and SUL. UE Tx power may then maintain the value indicated by the last commands before receiving any new indication and update to a new value according to a newly-received TPC, if any.

In some embodiments, for unified GUL power control, a unified $P_0$ and a separate TPC may be applied where a first parameter (e.g., "p0-NominalPUSCH") and a second parameter (e.g., "p0-UE-PUSCH") may be common for GUL and SUL, which may advantageously avoid the introducing of additional $P_0$ related parameters, and GUL may adopt TPC commands in G-DCI while SUL may use TPC commands in DCI. As for the adjustment method of TPC, a parameter (e.g., "Accumulation-enabled") may be shared for both SUL and GUL, or alternatively an independent parameter (e.g., "Accumulation-enabled-mf-grantless") may be introduced in RRC to indicate whether GUL enables the accumulation of dynamic power offset.

In some embodiments of unified GUL power control, a separate $P_0$ and a unified TPC may be applied, in which the unified TPC may be be one of three options for performing unified TPC discussed herein, and a separate $P_0$ may be be composed of a variety of combinations.

In a first option, a separate $P_0$ may be composed of a unified cell specific $P_0$ and a separate UE specific $P_0$, for example by reusing a first parameter (e.g., "p0-Nominal-PUSCH") as a common parameter for GUL and SUL, and introducing a second parameter (e.g., "p0-UE-PUSCH-mfgrantless") to separately indicate UE specific $P_0$ for GUL only.

In a second option, a separate $P_0$ may be composed of a separate cell specific $P_0$ and a separate UE specific $P_0$, for example by introducing GUL independent parameters (e.g., "p0-NominalPUSCH-mf-grantless" and "p0-UE-PUSCH-mf-grantless") as cell specific $P_0$ and UE specific $P_0$, respectively.

In a third option, a separate $P_0$ may be composed of a separate cell specific $P_0$ and a unified UE specific $P_0$, for example by reusing a first parameter (e.g., "p0-UE-PUSCH") as a common UE specific $P_0$ for GUL and SUL, and introducing a second parameter (e.g., "p0-Nominal-PUSCH-mf-grantless") as a cell specific $P_0$ for GUL only.

Note that in various embodiments, independent GUL parameters (e.g., "p0-NominalPUSCH-mf-grantless" and "p0-UE-PUSCH-mf-grantless") may be valid merely for GUL and might not be valid to adjust the uplink power for SUL.

Figure 7:
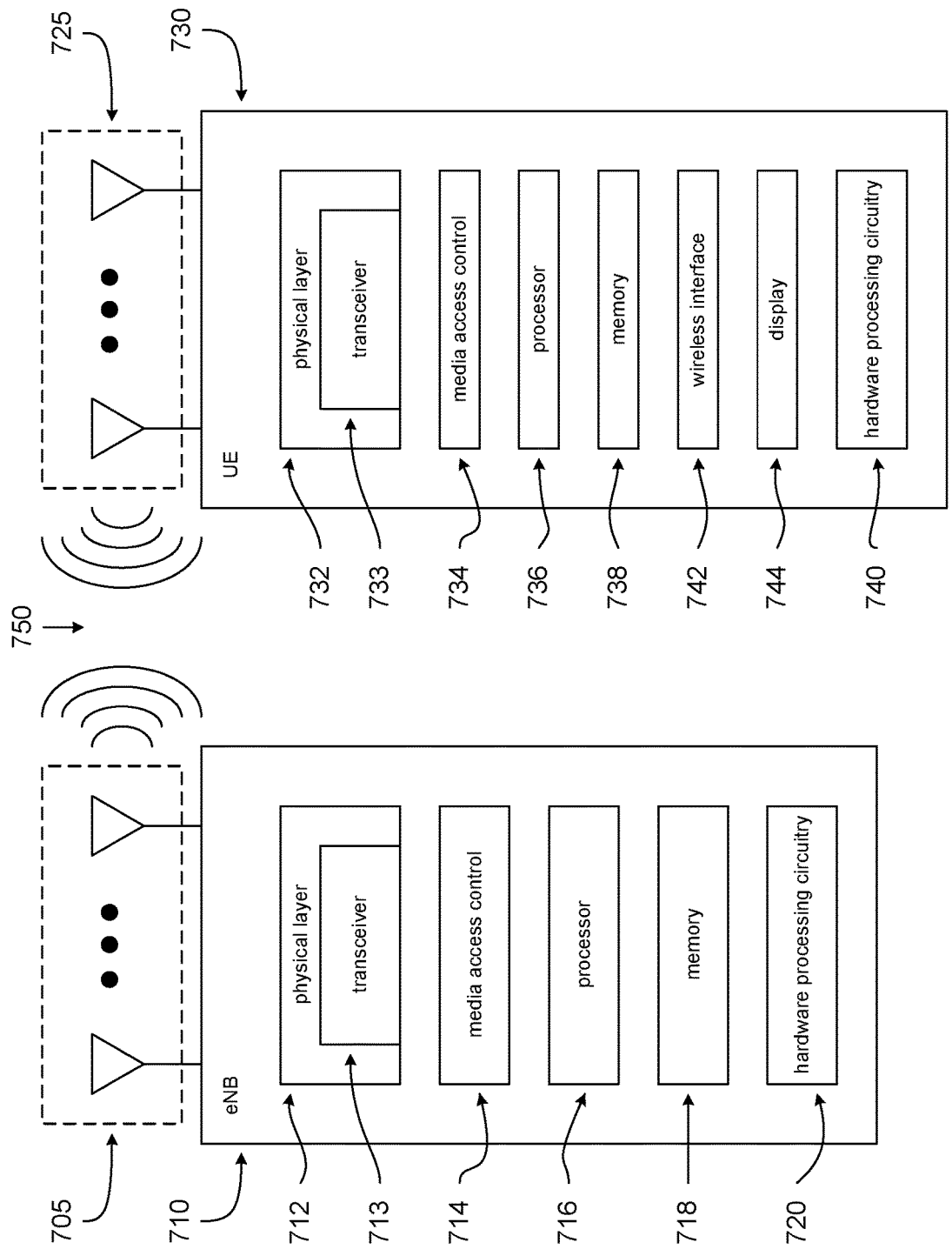
FIG. 7 illustrates an Evolved Node-B (eNB) and a User Equipment (UE), in accordance with some embodiments of the disclosure.

FIG. 7 illustrates an eNB and a UE, in accordance with some embodiments of the disclosure. FIG. 7 includes block diagrams of an eNB 710 and a UE 730 which are operable to co-exist with each other and other elements of an LTE network. High-level, simplified architectures of eNB 710 and UE 730 are described so as not to obscure the embodiments. It should be noted that in some embodiments, eNB 710 may be a stationary non-mobile device.

eNB 710 is coupled to one or more antennas 705, and UE 730 is similarly coupled to one or more antennas 725. However, in some embodiments, eNB 710 may incorporate or comprise antennas 705, and UE 730 in various embodiments may incorporate or comprise antennas 725.

In some embodiments, antennas 705 and/or antennas 725 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 705 are separated to take advantage of spatial diversity.

eNB 710 and UE 730 are operable to communicate with each other on a network, such as a wireless network. eNB 710 and UE 730 may be in communication with each other over a wireless communication channel 750, which has both a downlink path from eNB 710 to UE 730 and an uplink path from UE 730 to eNB 710.

As illustrated in FIG. 7, in some embodiments, eNB 710 may include a physical layer circuitry 712, a MAC (media access control) circuitry 714, a processor 716, a memory 718, and a hardware processing circuitry 720. A person skilled in the art will appreciate that other components not shown may be used in addition to the components shown to form a complete eNB.

In some embodiments, physical layer circuitry 712 includes a transceiver 713 for providing signals to and from UE 730. Transceiver 713 provides signals to and from UEs or other devices using one or more antennas 705. In some embodiments, MAC circuitry 714 controls access to the wireless medium. Memory 718 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 720 may comprise logic devices or circuitry to perform various operations. In some embodiments, processor 716 and memory 718 are arranged to perform the operations of hardware processing circuitry 720, such as operations described herein with reference to logic devices and circuitry within eNB 710 and/or hardware processing circuitry 720.

Accordingly, in some embodiments, eNB 710 may be a device comprising an application processor, a memory, one or more antenna ports, and an interface for allowing the application processor to communicate with another device.

As is also illustrated in FIG. 7, in some embodiments, UE 730 may include a physical layer circuitry 732, a MAC circuitry 734, a processor 736, a memory 738, a hardware processing circuitry 740, a wireless interface 742, and a display 744. A person skilled in the art would appreciate that other components not shown may be used in addition to the components shown to form a complete UE.

In some embodiments, physical layer circuitry 732 includes a transceiver 733 for providing signals to and from eNB 710 (as well as other eNBs). Transceiver 733 provides signals to and from eNBs or other devices using one or more antennas 725. In some embodiments, MAC circuitry 734 controls access to the wireless medium. Memory 738 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 742 may be arranged to allow the processor to communicate with another device. Display 744 may provide a visual and/or tactile display for a user to interact with UE 730, such as a touch-screen display. Hardware processing circuitry 740 may comprise logic devices or circuitry to perform various operations. In some embodiments, processor 736 and memory 738 may be arranged to perform the operations of hardware processing circuitry 740, such as operations described herein with reference to logic devices and circuitry within UE 730 and/or hardware processing circuitry 740.

Accordingly, in some embodiments, UE 730 may be a device comprising an application processor, a memory, one or more antennas, a wireless interface for allowing the application processor to communicate with another device, and a touch-screen display.

Elements of FIG. 7, and elements of other figures having the same names or reference numbers, can operate or function in the manner described herein with respect to any such figures (although the operation and function of such elements is not limited to such descriptions). For example, FIGS. 9 and 11-12 also depict embodiments of eNBs, hardware processing circuitry of eNBs, UEs, and/or hardware processing circuitry of UEs, and the embodiments described with respect to FIG. 7 and FIGS. 9 and 11-12 can operate or function in the manner described herein with respect to any of the figures.

In addition, although eNB 710 and UE 730 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 8:
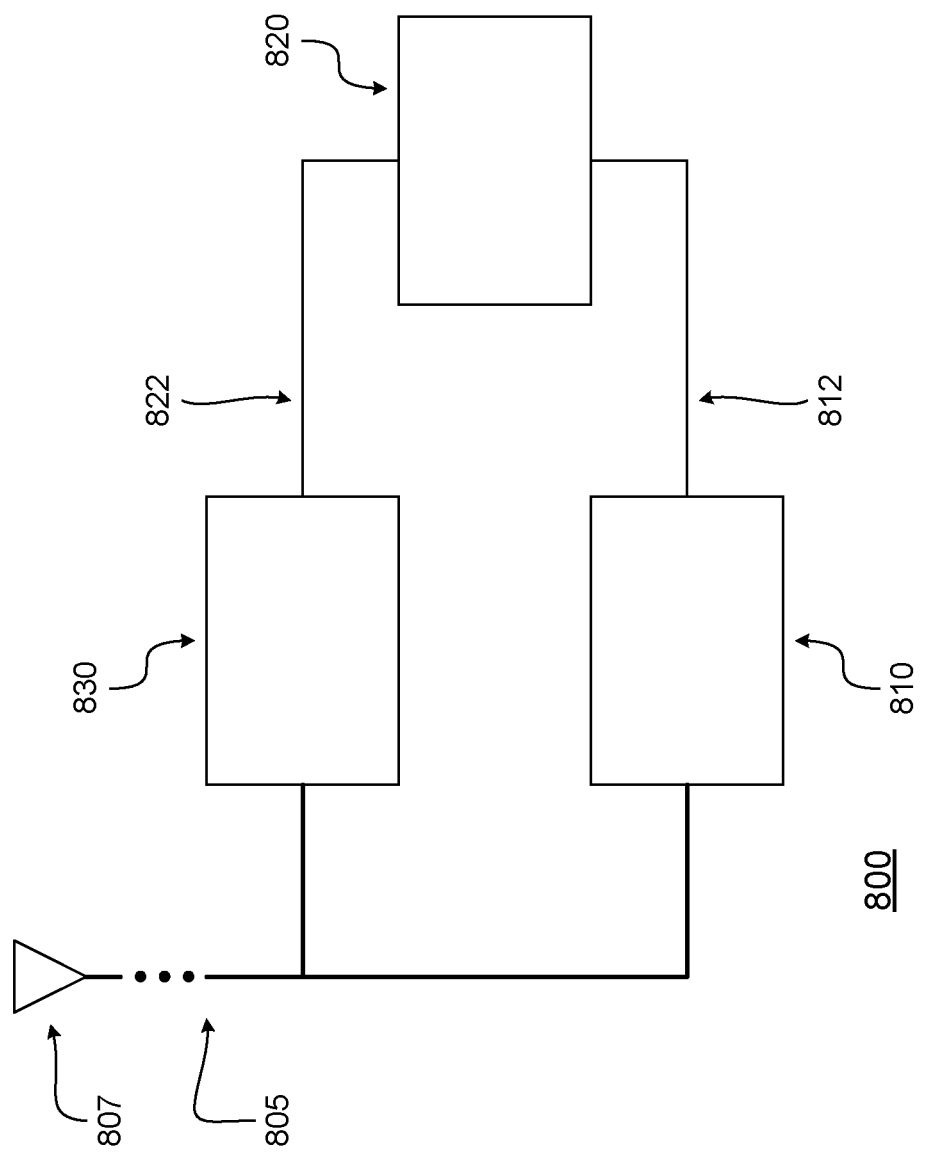
FIG. 8 illustrates hardware processing circuitries for a UE for enabling more flexible MCOT sharing, indicating MCOT related information in Grantless Uplink Control Information (G-UCI), and controlling UL Transmission (Tx) power for GUL, in accordance with some embodiments of the disclosure.

FIG. 8 illustrates hardware processing circuitries for a UE for for enabling more flexible MCOT sharing, indicating MCOT related information in G-UCI, and controlling UL Tx power for GUL, in accordance with some embodiments of the disclosure. With reference to FIG. 7, a UE may include various hardware processing circuitries discussed herein (such as hardware processing circuitry 800 of FIG. 8), which may in turn comprise logic devices and/or circuitry operable to perform various operations. For example, in FIG. 7, UE 730 (or various elements or components therein, such as hardware processing circuitry 740, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 736 (and/or one or more other processors which UE 730 may comprise), memory 738, and/or other elements or components of UE 730 (which may include hardware processing circuitry 740) may be arranged to perform the operations of these hardware processing circuitries, such as operations described herein with reference to devices and circuitry within these hardware processing circuitries. In some embodiments, processor 736 (and/or one or more other processors which UE 730 may comprise) may be a baseband processor.

Returning to FIG. 8, an apparatus of UE 730 (or another UE or mobile handset), which may be operable to communicate with one or more eNBs on a wireless network, may comprise hardware processing circuitry 800. In some embodiments, hardware processing circuitry 800 may comprise one or more antenna ports 805 operable to provide various transmissions over a wireless communication channel (such as wireless communication channel 750). Antenna ports 805 may be coupled to one or more antennas 807 (which may be antennas 725). In some embodiments, hardware processing circuitry 800 may incorporate antennas 807, while in other embodiments, hardware processing circuitry 800 may merely be coupled to antennas 807.

Antenna ports 805 and antennas 807 may be operable to provide signals from a UE to a wireless communications channel and/or an eNB, and may be operable to provide signals from an eNB and/or a wireless communications channel to a UE. For example, antenna ports 805 and antennas 807 may be operable to provide transmissions from UE 730 to wireless communication channel 750 (and from there to eNB 710, or to another eNB). Similarly, antennas 807 and antenna ports 805 may be operable to provide transmissions from a wireless communication channel 750 (and beyond that, from eNB 710, or another eNB) to UE 730.

Hardware processing circuitry 800 may comprise various circuitries operable in accordance with the various embodiments discussed herein. With reference to FIG. 8, hardware processing circuitry 800 may comprise a first circuitry 810, a second circuitry 820, and/or a third circuitry 830.

In a variety of embodiments, first circuitry 810 may be operable to process one or more configuration transmissions from the eNB carrying one or more parameters for GUL transmission. Second circuitry 820 may be operable to determine one or more GUL subframes of an acquired MCOT on time-domain resources allocated for GUL transmission from the UE. Third circuitry 830 may be operable to generate a GUL transmission during the one or more GUL subframes of the acquired MCOT in accordance with the one or more parameters for GUL transmission. First circuitry 810 may be operable to provide information pertaining to the one or more parameters for GUL transmission to second circuitry 820, and/or (through second circuitry 820) to third circuitry 830. Second circuitry 820 may be operable to provide information pertaining to the one or more GUL subframes of the acquired MCOT to third circuitry 830 via an interface 822. Hardware processing circuitry 800 may comprise an interface for receiving configuration transmissions from a receiving circuitry and for sending GUL transmissions to a transmission circuitry.

In some embodiments, one or more of the GUL subframes of the MCOT may be reserved subframes that overlap with at least one of a DRS window and a PRACH. For some embodiments, the GUL transmission may be generated between an end of the reserved subframes and an end of the GUL subframes of the MCOT. In some embodiments, the GUL transmission may be generated before a beginning of the reserved subframes. For some embodiments, the GUL transmission may be generated in one or more subframes outside the reserved subframes and may continue within the DRS window after presence of a DRS is detected.

For some embodiments, the one or more parameters for GUL transmission may comprise a sharing indicator related to a subframe N on which the GUL transmission is generated. The indicator may have a variety of values. A first value may indicate that a subframe N+2 can be shared, and that a remaining portion of the acquired MCOT starting from subframe N+2 comprises 8 subframes. A second value may indicate that the subframe N+2 can be shared, and that the remaining portion of the acquired MCOT starting from subframe N+2 comprises 7 subframes. A third value may indicate that the subframe N+2 can be shared, and that the remaining portion of the acquired MCOT starting from subframe N+2 comprises 6 subframes. A fourth value may indicate that the subframe N+2 can be shared, and that the remaining portion of the acquired MCOT starting from subframe N+2 comprises 5 subframes. A fifth value may indicate that the subframe N+2 can be shared, and that the remaining portion of the acquired MCOT starting from subframe N+2 comprises 4 subframes. A sixth value may indicate that the subframe N+2 can be shared, and that the remaining portion of the acquired MCOT starting from subframe N+2 comprises 3 subframes. A seventh value may indicate that the subframe N+2 can be shared, and that the remaining portion of the acquired MCOT starting from subframe N+2 comprises 2 subframes. An eighth value may indicate that the remaining portion of the acquired MCOT starting from subframe N+2 cannot be shared.

In some embodiments, third circuitry 830 may be operable to generate a G-UCI transmission carrying the sharing indicator.

For some embodiments, the one or more parameters for GUL transmission may comprise a first indicator of a number of GUL subframes before an ending of a burst, and/or a second indicator for a number of GUL subframes that can be shared with the eNB. In some embodiments, the one or more parameters for GUL transmission may comprise a joint indicator of both a number of GUL subframes before an ending of a burst and a number of GUL subframes that can be shared with the eNB.

In a variety of embodiments, first circuitry 810 may be operable to process a first DCI transmission carrying a first TPC command for SUL transmission, and may also be operable to process a second DCI transmission carrying a second TPC command for GUL transmission. Third circuitry 830 may be operable to generate a first UL transmission for scheduled UL transmission in accordance with the first TPC command, and may also be operable to generate a second UL transmission for grantless UL transmission in accordance with the second TPC command. First circuitry 810 may be operable to provide information pertaining to the first TPC command and/or the second TPC command to second circuitry 820, and/or (through second circuitry 820) to third circuitry 830. Hardware processing circuitry 800 may comprise an interface for receiving DCI transmissions from a receiving circuitry and for sending UL transmissions to a transmission circuitry.

In some embodiments, first circuitry 810 may be operable to process one or more configuration transmissions from the eNB carrying one or more TPC parameters for GUL transmission.

For some embodiments, the one or more TPC parameters may comprise an indicator to enable an accumulation of dynamic power offset for GUL transmission. In some embodiments, the one or more configuration transmissions may comprise a SIB2, and the one or more TPC parameters may comprise an indicator for cell specific $P_0$ for GUL transmission. For some embodiments, the one or more configuration transmissions may comprise a RRC transmission, and the one or more TPC parameters may comprise an indicator for UE specific $P_0$ for GUL transmission.

In some embodiments, first circuitry 810, second circuitry 820, and/or third circuitry 830 may be implemented as separate circuitries. In other embodiments, first circuitry 810, second circuitry 820, and/or third circuitry 830 may be combined and implemented together in a circuitry without altering the essence of the embodiments.

Figure 9:
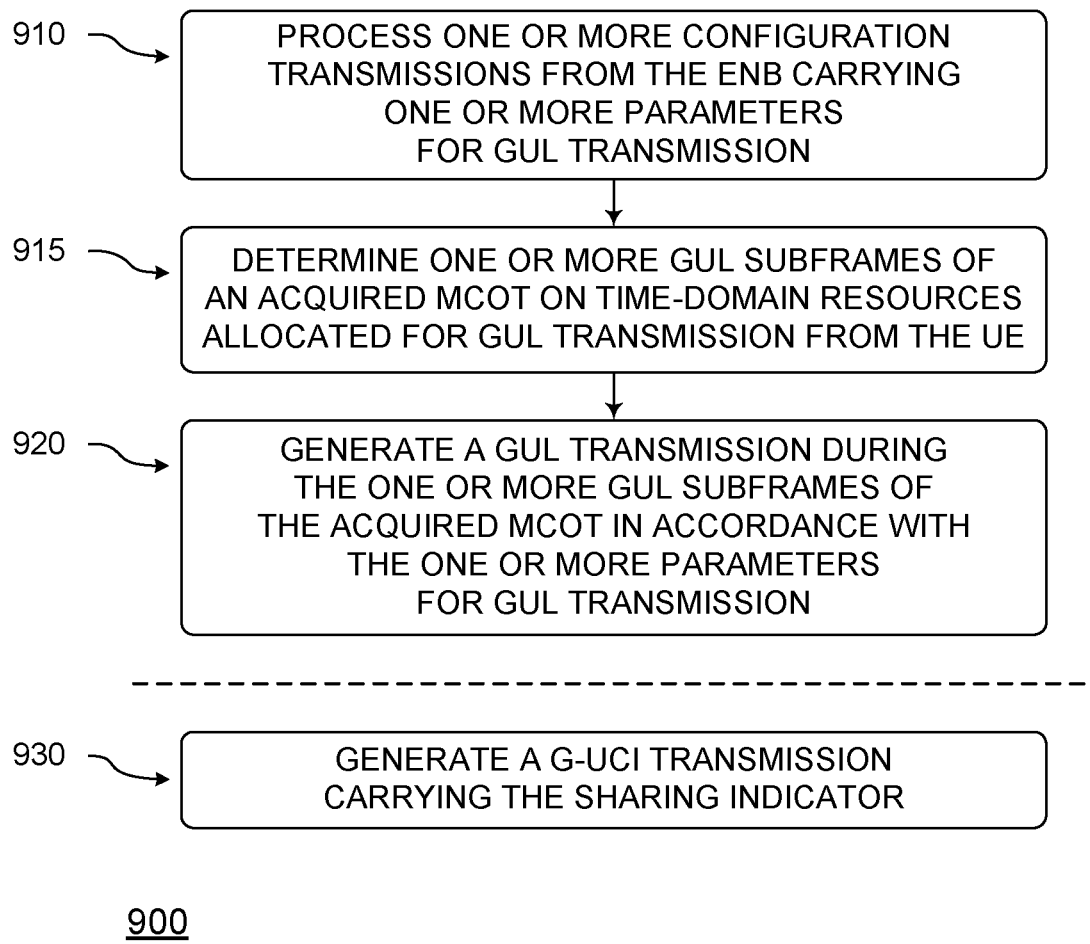
FIG. 9 illustrates methods for a UE for enabling more flexible MCOT sharing, in accordance with some embodiments of the disclosure.
Figure 10:
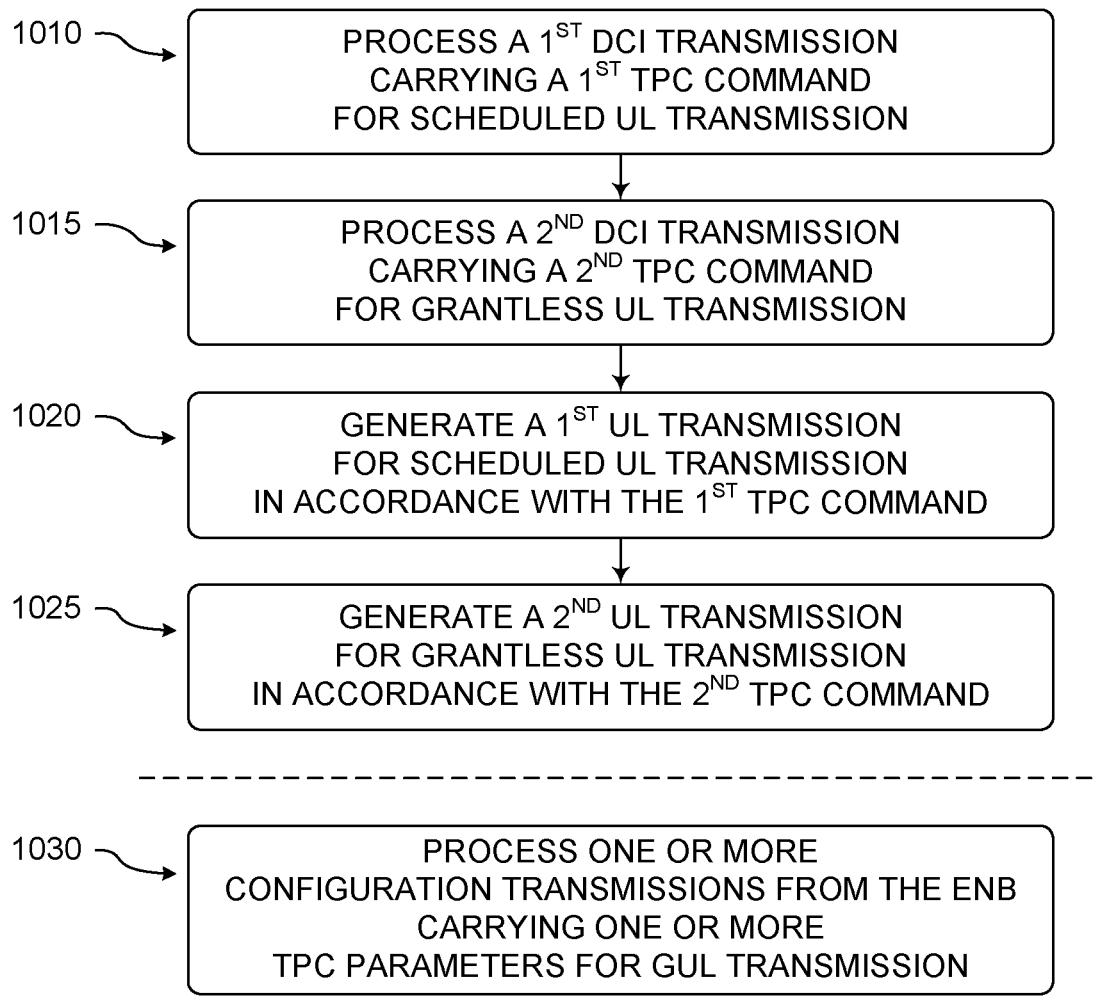
FIG. 10 illustrates methods for a UE for indicating MCOT related information in G-UCI and controlling UL Tx power for GUL, in accordance with some embodiments of the disclosure.

FIG. 9 illustrates methods for a UE for enabling more flexible MCOT sharing, in accordance with some embodiments of the disclosure. FIG. 10 illustrates methods for a UE for indicating MCOT related information in G-UCI and controlling UL Tx power for GUL, in accordance with some embodiments of the disclosure. With reference to FIG. 7, methods that may relate to UE 730 and hardware processing circuitry 740 are discussed herein. Although the actions in method 900 of FIG. 9 and method 1000 of FIG. 10 are shown in a particular order, the order of the actions can be modified. Thus, the illustrated embodiments can be performed in a different order, and some actions may be performed in parallel. Some of the actions and/or operations listed in FIGS. 9 and 10 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 730 and/or hardware processing circuitry 740 to perform an operation comprising the methods of FIGS. 9 and 10. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 9 and 10.

Returning to FIG. 9, various methods may be in accordance with the various embodiments discussed herein. A method 900 may comprise a processing 910, a determining 915, and a generating 920. In some embodiments, method 900 may comprise a generating 930.

In processing 910, one or more configuration transmissions from the eNB carrying one or more parameters for GUL transmission may be processed. In determining 915, one or more GUL subframes of an acquired MCOT on time-domain resources allocated for GUL transmission from the UE may be determined. In generating 920, a GUL transmission may be generated during the one or more GUL subframes of the acquired MCOT in accordance with the one or more parameters for GUL transmission.

In some embodiments, one or more of the GUL subframes of the MCOT may be reserved subframes that overlap with at least one of a DRS window and a PRACH. For some embodiments, the GUL transmission may be generated between an end of the reserved subframes and an end of the GUL subframes of the MCOT. In some embodiments, the GUL transmission may be generated before a beginning of the reserved subframes. For some embodiments, the GUL transmission may be generated in one or more subframes outside the reserved subframes and may continue within the DRS window after presence of a DRS is detected.

For some embodiments, the one or more parameters for GUL transmission may comprise a sharing indicator related to a subframe N on which the GUL transmission is generated. The indicator may have a variety of values. A first value may indicate that a subframe N+2 can be shared, and that a remaining portion of the acquired MCOT starting from subframe N+2 comprises 8 subframes. A second value may indicate that the subframe N+2 can be shared, and that the remaining portion of the acquired MCOT starting from subframe N+2 comprises 7 subframes. A third value may indicate that the subframe N+2 can be shared, and that the remaining portion of the acquired MCOT starting from subframe N+2 comprises 6 subframes. A fourth value may indicate that the subframe N+2 can be shared, and that the remaining portion of the acquired MCOT starting from subframe N+2 comprises 5 subframes. A fifth value may indicate that the subframe N+2 can be shared, and that the remaining portion of the acquired MCOT starting from subframe N+2 comprises 4 subframes. A sixth value may indicate that the subframe N+2 can be shared, and that the remaining portion of the acquired MCOT starting from subframe N+2 comprises 3 subframes. A seventh value may indicate that the subframe N+2 can be shared, and that the remaining portion of the acquired MCOT starting from subframe N+2 comprises 2 subframes. An eighth value may indicate that the remaining portion of the acquired MCOT starting from subframe N+2 cannot be shared.

In some embodiments, in generating 930, a G-UCI transmission carrying the sharing indicator may be generated.

For some embodiments, the one or more parameters for GUL transmission may comprise a first indicator of a number of GUL subframes before an ending of a burst, and/or a second indicator for a number of GUL subframes that can be shared with the eNB. In some embodiments, the one or more parameters for GUL transmission may comprise a joint indicator of both a number of GUL subframes before an ending of a burst and a number of GUL subframes that can be shared with the eNB.

Returning to FIG. 10, various methods may be in accordance with the various embodiments discussed herein. A method 1000 may comprise a processing 1010, a processing 1015, a generating 1020, and a generating 1025.

In processing 1010, a first DCI transmission carrying a first TPC command for SUL transmission may be processed. In processing 1015, a second DCI transmission carrying a second TPC command for GUL transmission may be processed. In generating 1020, a first UL transmission for scheduled UL transmission may be generated in accordance with the first TPC command. In generating 1025, a second UL transmission for grantless UL transmission may be generated in accordance with the second TPC command.

In some embodiments, in processing 1030, one or more configuration transmissions from the eNB carrying one or more TPC parameters for GUL transmission may be processed.

For some embodiments, the one or more TPC parameters may comprise an indicator to enable an accumulation of dynamic power offset for GUL transmission. In some embodiments, the one or more configuration transmissions may comprise a SIB2, and the one or more TPC parameters may comprise an indicator for cell specific $P_0$ for GUL transmission. For some embodiments, the one or more configuration transmissions may comprise a RRC transmission, and the one or more TPC parameters may comprise an indicator for UE specific $P_0$ for GUL transmission.

Figure 11:
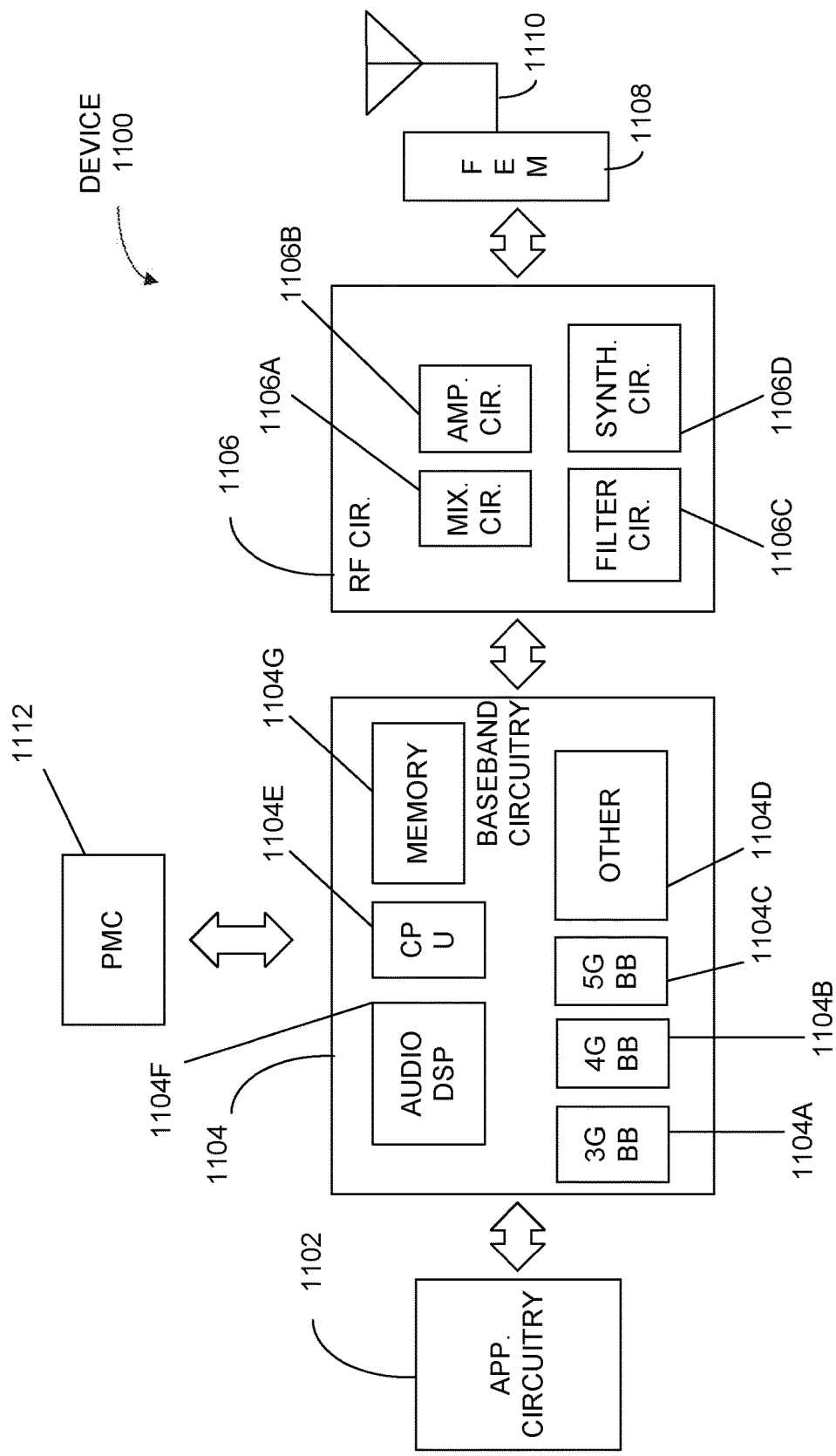
FIG. 11 illustrates example components of a device, in accordance with some embodiments of the disclosure.

FIG. 11 illustrates example components of a device, in accordance with some embodiments of the disclosure. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuity 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), and so on). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, and so on. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, and so on to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106A, amplifier circuitry 1106B and filter circuitry 1106C. In some embodiments, the transmit signal path of the RF circuitry 1106 may include filter circuitry 1106C and mixer circuitry 1106A. RF circuitry 1106 may also include synthesizer circuitry 1106D for synthesizing a frequency for use by the mixer circuitry 1106A of the receive signal path and the transmit signal path. In some embodiments, the mixer circuitry 1106A of the receive signal path may be configured to down-convert RF signals received from the FEM circuitry 1108 based on the synthesized frequency provided by synthesizer circuitry 1106D. The amplifier circuitry 1106B may be configured to amplify the down-converted signals and the filter circuitry 1106C may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106A of the receive signal path may comprise passive mixers, although the scope of the embodiments is not limited in this respect.

In some embodiments, the mixer circuitry 1106A of the transmit signal path may be configured to up-convert input baseband signals based on the synthesized frequency provided by the synthesizer circuitry 1106D to generate RF output signals for the FEM circuitry 1108. The baseband signals may be provided by the baseband circuitry 1104 and may be filtered by filter circuitry 1106C.

In some embodiments, the mixer circuitry 1106A of the receive signal path and the mixer circuitry 1106A of the transmit signal path may include two or more mixers and may be arranged for quadrature downconversion and upconversion, respectively. In some embodiments, the mixer circuitry 1106A of the receive signal path and the mixer circuitry 1106A of the transmit signal path may include two or more mixers and may be arranged for image rejection (e.g., Hartley image rejection). In some embodiments, the mixer circuitry 1106A of the receive signal path and the mixer circuitry 1106A may be arranged for direct downconversion and direct upconversion, respectively. In some embodiments, the mixer circuitry 1106A of the receive signal path and the mixer circuitry 1106A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106D may be a fractional-N synthesizer or a fractional N/N+1 synthesizer, although the scope of the embodiments is not limited in this respect as other types of frequency synthesizers may be suitable. For example, synthesizer circuitry 1106D may be a delta-sigma synthesizer, a frequency multiplier, or a synthesizer comprising a phase-locked loop with a frequency divider.

The synthesizer circuitry 1106D may be configured to synthesize an output frequency for use by the mixer circuitry 1106A of the RF circuitry 1106 based on a frequency input and a divider control input. In some embodiments, the synthesizer circuitry 1106D may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106D of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC Idle state, where it disconnects from the network and does not perform operations such as channel quality feedback, handover, and so on. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
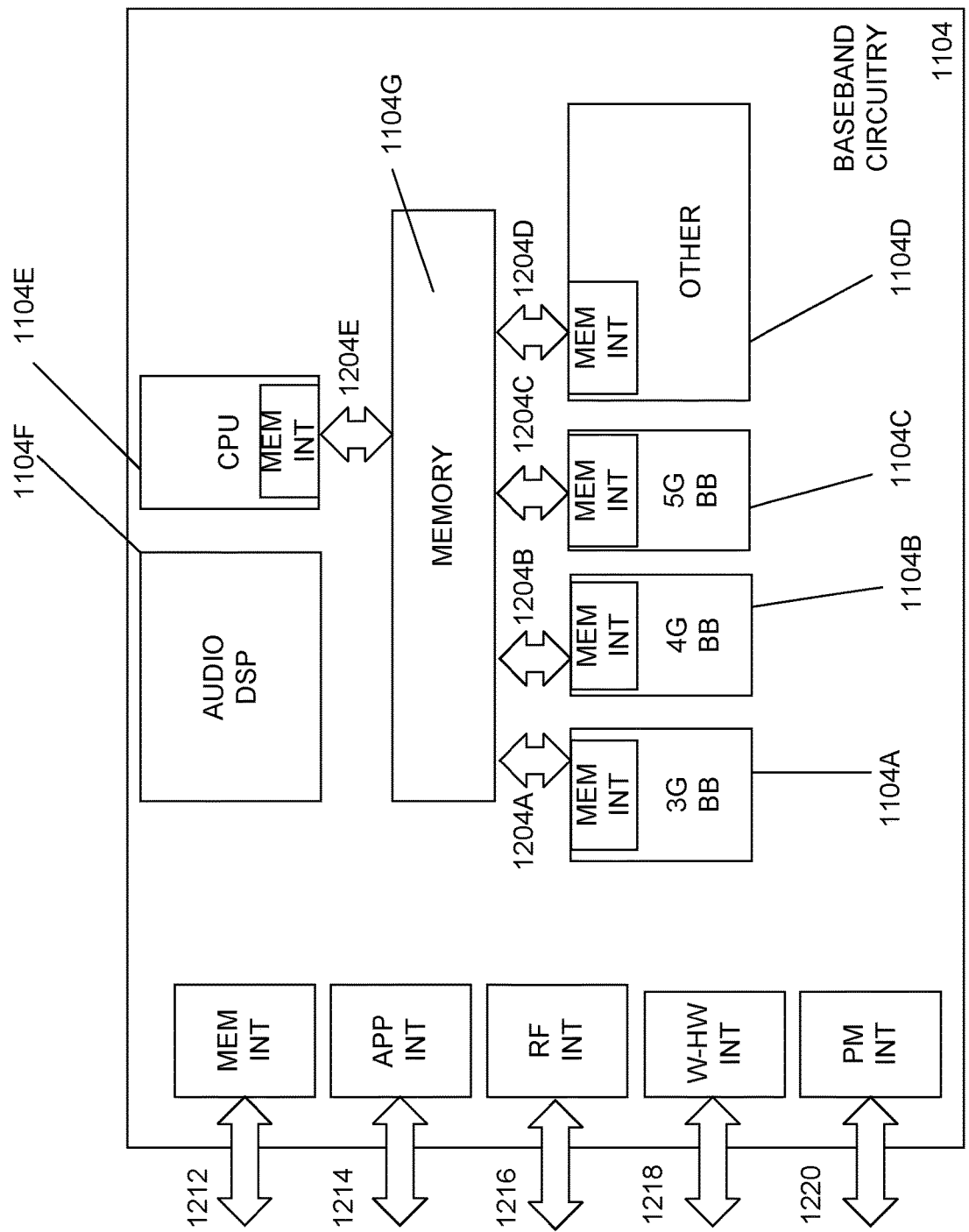
FIG. 12 illustrates example interfaces of baseband circuitry, in accordance with some embodiments of the disclosure.

FIG. 12 illustrates example interfaces of baseband circuitry, in accordance with some embodiments of the disclosure. As discussed above, the baseband circuitry 1104 of FIG. 11 may comprise processors 1104A-1104E and a memory 1104G utilized by said processors. Each of the processors 1104A-1104E may include a memory interface, 1204A-1204E, respectively, to send/receive data to/from the memory 1104G.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: process one or more configuration transmissions from the eNB carrying one or more parameters for Grantless Uplink (GUL) transmission; determine one or more GUL subframes of an acquired Maximum Channel Occupancy Time (MCOT) on time-domain resources allocated for GUL transmission from the UE; and generate a GUL transmission during the one or more GUL subframes of the acquired MCOT in accordance with the one or more parameters for GUL transmission, and an interface for receiving configuration transmissions from a receiving circuitry and for sending GUL transmissions to a transmission circuitry.

In example 2, the apparatus of example 1, wherein one or more of the GUL subframes of the MCOT are reserved subframes that overlap with at least one of a Discovery Reference Signal (DRS) window and a Physical Random Access Channel (PRACH).

In example 3, the apparatus of example 2, wherein the GUL transmission is generated between an end of the reserved subframes and an end of the GUL subframes of the MCOT.

In example 4, the apparatus of example 2, wherein the GUL transmission is generated before a beginning of the reserved subframes.

In example 5, the apparatus of example 2, wherein the GUL transmission is generated in one or more subframes outside the reserved subframes and continues within the DRS window after presence of a DRS is detected.

In example 6, the apparatus of any of examples 1 through 5, wherein the one or more parameters for GUL transmission comprise a sharing indicator related to a subframe N on which the GUL transmission is generated, the indicator having a value selected from: a first value indicating that a subframe N+2 can be shared, and that a remaining portion of the acquired MCOT starting from subframe N+2 comprises 8 subframes; a second value indicating that the subframe N+2 can be shared, and that the remaining portion of the acquired MCOT starting from subframe N+2 comprises 7 subframes; a third value indicating that the subframe N+2 can be shared, and that the remaining portion of the acquired MCOT starting from subframe N+2 comprises 6 subframes; a fourth value indicating that the subframe N+2 can be shared, and that the remaining portion of the acquired MCOT starting from subframe N+2 comprises 5 subframes; a fifth value indicating that the subframe N+2 can be shared, and that the remaining portion of the acquired MCOT starting from subframe N+2 comprises 4 subframes; a sixth value indicating that the subframe N+2 can be shared, and that the remaining portion of the acquired MCOT starting from subframe N+2 comprises 3 subframes; a seventh value indicating that the subframe N+2 can be shared, and that the remaining portion of the acquired MCOT starting from subframe N+2 comprises 2 subframes; and an eighth value indicating that the remaining portion of the acquired MCOT starting from subframe N+2 cannot be shared.

In example 7, the apparatus of example 6, generate a Grantless Uplink Control Information (G-UCI) transmission carrying the sharing indicator.

In example 8, the apparatus of any of examples 1 through 7, wherein the one or more parameters for GUL transmission comprise at least one of: a first indicator of a number of GUL subframes before an ending of a burst; and a second indicator for a number of GUL subframes that can be shared with the eNB.

In example 9, the apparatus of any of examples 1 through 8, wherein the one or more parameters for GUL transmission comprise a joint indicator of both a number of GUL subframes before an ending of a burst and a number of GUL subframes that can be shared with the eNB.

Example 10 provides a User Equipment (UE) device comprising an application processor, a memory, one or more antennas, a wireless interface for allowing the application processor to communicate with another device, and a touch-screen display, the UE device including the apparatus of any of examples 1 through 9.

Example 11 provides machine readable storage media having machine executable instructions that, when executed, cause one or more processors of a User Equipment (UE) operable to communicate with an Evolved Node-B (eNB) on a wireless network to perform an operation comprising: process one or more configuration transmissions from the eNB carrying one or more parameters for Grantless Uplink (GUL) transmission; determine one or more GUL subframes of an acquired Maximum Channel Occupancy Time (MCOT) on time-domain resources allocated for GUL transmission from the UE; and generate a GUL transmission during the one or more GUL subframes of the acquired MCOT in accordance with the one or more parameters for GUL transmission.

In example 12, the machine readable storage media of example 11, wherein one or more of the GUL subframes of the MCOT are reserved subframes that overlap with at least one of a Discovery Reference Signal (DRS) window and a Physical Random Access Channel (PRACH).

In example 13, the machine readable storage media of example 12, wherein the GUL transmission is generated between an end of the reserved subframes and an end of the GUL subframes of the MCOT.

In example 14, the machine readable storage media of example 12, wherein the GUL transmission is generated before a beginning of the reserved subframes.

In example 15, the machine readable storage media of example 12, wherein the GUL transmission is generated in one or more subframes outside the reserved subframes and continues within the DRS window after presence of a DRS is detected.

In example 16, the machine readable storage media of any of examples 11 through 15, wherein the one or more parameters for GUL transmission comprise a sharing indicator related to a subframe N on which the GUL transmission is generated, the indicator having a value selected from: a first value indicating that a subframe N+2 can be shared, and that a remaining portion of the acquired MCOT starting from subframe N+2 comprises 8 subframes; a second value indicating that the subframe N+2 can be shared, and that the remaining portion of the acquired MCOT starting from subframe N+2 comprises 7 subframes; a third value indicating that the subframe N+2 can be shared, and that the remaining portion of the acquired MCOT starting from subframe N+2 comprises 6 subframes; a fourth value indicating that the subframe N+2 can be shared, and that the remaining portion of the acquired MCOT starting from subframe N+2 comprises 5 subframes; a fifth value indicating that the subframe N+2 can be shared, and that the remaining portion of the acquired MCOT starting from subframe N+2 comprises 4 subframes; a sixth value indicating that the subframe N+2 can be shared, and that the remaining portion of the acquired MCOT starting from subframe N+2 comprises 3 subframes; a seventh value indicating that the subframe N+2 can be shared, and that the remaining portion of the acquired MCOT starting from subframe N+2 comprises 2 subframes; and an eighth value indicating that the remaining portion of the acquired MCOT starting from subframe N+2 cannot be shared.

In example 17, the apparatus of example 16, generate a Grantless Uplink Control Information (G-UCI) transmission carrying the sharing indicator.

In example 18, the machine readable storage media of any of examples 11 through 17, wherein the one or more parameters for GUL transmission comprise at least one of: a first indicator of a number of GUL subframes before an ending of a burst; and a second indicator for a number of GUL subframes that can be shared with the eNB.

In example 19, the machine readable storage media of any of examples 11 through 18, wherein the one or more parameters for GUL transmission comprise a joint indicator of both a number of GUL subframes before an ending of a burst and a number of GUL subframes that can be shared with the eNB.

Example 20 provides an apparatus of a User Equipment (UE) operable to communicate with an Evolved Node B (eNB) on a wireless network, comprising: one or more processors to: process a first Downlink Control Information (DCI) transmission carrying a first Transmit Power Control (TPC) command for Scheduled Uplink (SUL) transmission; process a second DCI transmission carrying a second TPC command for Grantless Uplink (GUL) tranmission; generate a first Uplink (UL) transmission for scheduled UL transmission in accordance with the first TPC command; and generate a second UL transmission for grantless UL transmission in accordance with the second TPC command, and an interface for receiving DCI transmissions from a receiving circuitry and for sending UL transmissions to a transmission circuitry.

In example 21, the apparatus of example 20, wherein the one or more processors are to: process one or more configuration transmissions from the eNB carrying one or more TPC parameters for GUL transmission.

In example 22, the apparatus of example 21, wherein the one or more TPC parameters comprises an indicator to enable an accumulation of dynamic power offset for GUL transmission.

In example 23, the apparatus of example 21, wherein the one or more configuration transmissions comprises a System Information Block 2 (SIB2) transmission; and wherein the one or more TPC parameters comprises an indicator for cell specific P_0 for GUL transmission.

In example 24, the apparatus of example 21, wherein the one or more configuration transmissions comprises a Radio Resource Control (RRC) transmission; and wherein the one or more TPC parameters comprises an indicator for UE specific P_0 for GUL transmission.

Example 25 provides a User Equipment (UE) device comprising an application processor, a memory, one or more antennas, a wireless interface for allowing the application processor to communicate with another device, and a touchscreen display, the UE device including the apparatus of any of examples 20 through 24.

Example 26 provides machine readable storage media having machine executable instructions that, when executed, cause one or more processors of a User Equipment (UE) operable to communicate with an Evolved Node-B (eNB) on a wireless network to perform an operation comprising: process a first Downlink Control Information (DCI) transmission carrying a first Transmit Power Control (TPC) command for Scheduled Uplink (SUL) transmission; process a second DCI transmission carrying a second TPC command for Grantless Uplink (GUL) tranmission; generate a first Uplink (UL) transmission for scheduled UL transmission in accordance with the first TPC command; and generate a second UL transmission for grantless UL transmission in accordance with the second TPC command.

In example 27, the machine readable storage media of example 26, the operation comprising: process one or more configuration transmissions from the eNB carrying one or more TPC parameters for GUL transmission.

In example 28, the machine readable storage media of example 27, wherein the one or more TPC parameters comprises an indicator to enable an accumulation of dynamic power offset for GUL transmission.

In example 29, the machine readable storage media of example 27, wherein the one or more configuration transmissions comprises a System Information Block 2 (SIB2)

transmission; and wherein the one or more TPC parameters comprises an indicator for cell specific P_0 for GUL transmission.

In example 30, the machine readable storage media of example 27, wherein the one or more configuration transmissions comprises a Radio Resource Control (RRC) transmission; and wherein the one or more TPC parameters comprises an indicator for UE specific P_0 for GUL transmission.

In example 31, the apparatus of any of examples 1 through 9, and 20 through 24, wherein the one or more processors comprise a baseband processor.

In example 32, the apparatus of any of examples 1 through 9, and 20 through 24, comprising a memory for storing instructions, the memory being coupled to the one or more processors.

In example 33, the apparatus of any of examples 1 through 9, and 20 through 24, comprising a transceiver circuitry for at least one of: generating transmissions, encoding transmissions, processing transmissions, or decoding transmissions.

In example 34, the apparatus of any of examples 1 through 9, and 20 through 24, comprising a transceiver circuitry for generating transmissions and processing transmissions. An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station (BS) on a wireless network, comprising:
   one or more processors to:
      process one or more configuration transmissions from the BS carrying one or more parameters for Grantless Uplink (GUL) transmission;
      determine one or more GUL subframes of an acquired Maximum Channel Occupancy Time (MCOT) on time-domain resources allocated for GUL transmission from the UE; and
      generate a GUL transmission during the one or more GUL subframes of the acquired MCOT in accordance with the one or more parameters for GUL transmission, wherein the GUL transmission comprises information corresponding to the acquired MCOT, and
   an interface for receiving configuration transmissions from a receiving circuitry and for sending GUL transmissions to a transmission circuitry.

2. The UE of claim 1,
wherein the one or more GUL subframes of the acquired MCOT are reserved subframes that overlap with at least one of a Discovery Reference Signal (DRS) window and a Physical Random Access Channel (PRACH).

3. The apparatus UE of claim 1,
wherein the GUL transmission comprises a sharing indicator having a value selected from:
   a first value indicating that a subframe N+2 can be shared, and that a remaining portion of the acquired MCOT starting from subframe N+2 comprises 8 subframes;
   a second value indicating that the subframe N+2 can be shared, and that the remaining portion of the acquired MCOT starting from subframe N+2 comprises 7 subframes;
   a third value indicating that the subframe N+2 can be shared, and that the remaining portion of the acquired MCOT starting from subframe N+2 comprises 6 subframes;
   a fourth value indicating that the subframe N+2 can be shared, and that the remaining portion of the acquired MCOT starting from subframe N+2 comprises 5 subframes;
   a fifth value indicating that the subframe N+2 can be shared, and that the remaining portion of the acquired MCOT starting from subframe N+2 comprises 4 subframes;
   a sixth value indicating that the subframe N+2 can be shared, and that the remaining portion of the acquired MCOT starting from subframe N+2 comprises 3 subframes;
   a seventh value indicating that the subframe N+2 can be shared, and that the remaining portion of the acquired MCOT starting from subframe N+2 comprises 2 subframes; and
   an eighth value indicating that the remaining portion of the acquired MCOT starting from subframe N+2 cannot be shared.

4. The UE of claim 3, wherein the one or more processors are to:
   generate a Grantless Uplink Control Information (G-UCI) transmission carrying the sharing indicator.

5. The apparatus UE of claim 1,
wherein the GUL transmission comprises at least one of:
   a first indicator of a number of GUL subframes before an ending of a burst;
   and a second indicator for a number of GUL subframes that can be shared with the BS.

6. The apparatus UE of claim 1,
wherein the GUL transmission comprises a joint indicator of both a number of GUL subframes before an ending of a burst and a number of GUL subframes that can be shared with the BS.

7. The UE of claim 2, wherein the GUL transmission is generated between an end of the one or more reserved subframes and an end of the one or more GUL subframes of the acquired MCOT.

8. The UE of claim 3, wherein the GUL transmission is generated before a beginning of the reserved subframes.

9. The UE of claim 1, wherein the information corresponding to the acquired MCOT comprises an indication of remaining MCOT.

10. The UE of claim 1, wherein the information corresponding to the acquired MCOT comprises an indication of a GUL boundary.

11. A non-transitory computer readable medium having machine executable instructions that, when executed, cause one or more processors of a User Equipment (UE) operable to communicate with a base station (BS) on a wireless network to perform operations comprising:
   processing one or more configuration transmissions from the BS carrying one or more parameters for Grantless Uplink (GUL) transmission;
   determining one or more GUL subframes of an acquired Maximum Channel Occupancy Time (MCOT) on time-domain resources allocated for GUL transmission from the UE; and
   generating a GUL transmission during the one or more GUL subframes of the acquired MCOT in accordance with the one or more parameters for GUL transmission, wherein the GUL transmission comprises information corresponding to the acquired MCOT.

12. The non-transitory computer readable medium of claim 11,
wherein the one or more GUL subframes of the acquired MCOT are reserved subframes that overlap with at least one of a Discovery Reference Signal (DRS) window and a Physical Random Access Channel (PRACH).

13. The machine readable storage media non-transitory computer readable medium of claim 11,
wherein the GUL transmission comprises a sharing indicator having a value selected from:
a first value indicating that a subframe N+2 can be shared, and that a remaining portion of the acquired MCOT starting from subframe N+2 comprises 8 subframes;
a second value indicating that the subframe N+2 can be shared, and that the remaining portion of the acquired MCOT starting from subframe N+2 comprises 7 subframes;
a third value indicating that the subframe N+2 can be shared, and that the remaining portion of the acquired MCOT starting from subframe N+2 comprises 6 subframes;
a fourth value indicating that the subframe N+2 can be shared, and that the remaining portion of the acquired MCOT starting from subframe N+2 comprises 5 subframes;
a fifth value indicating that the subframe N+2 can be shared, and that the remaining portion of the acquired MCOT starting from subframe N+2 comprises 4 subframes;
a sixth value indicating that the subframe N+2 can be shared, and that the remaining portion of the acquired MCOT starting from subframe N+2 comprises 3 subframes;
a seventh value indicating that the subframe N+2 can be shared, and that the remaining portion of the acquired MCOT starting from subframe N+2 comprises 2 subframes; and
an eighth value indicating that the remaining portion of the acquired MCOT starting from subframe N+2 cannot be shared.

14. The machine readable storage media non-transitory computer readable medium of claim 13, the operations further comprising:
generating a Grantless Uplink Control Information (G-UCI) transmission carrying the sharing indicator.

15. The non-transitory computer readable medium of claim 11,
wherein the GUL transmission comprise at least one of: a first indicator of a number of GUL subframes before an ending of a burst;
and a second indicator for a number of GUL subframes that can be shared with the BS.

16. The machine readable storage media non-transitory computer readable medium of claim 11,
wherein the or GUL transmission comprises a joint indicator of both a number of GUL subframes before an ending of a burst and a number of GUL subframes that can be shared with the BS.

17. A method comprising:
processing, by a user equipment (UE), one or more configuration transmissions from a base station (BS) carrying one or more parameters for Grantless Uplink (GUL) transmission;
determining, by the UE, one or more GUL subframes of an acquired Maximum Channel Occupancy Time (MCOT) on time-domain resources allocated for GUL transmission from the UE; and
generating, by the UE, a GUL transmission during the one or more GUL subframes of the acquired MCOT in accordance with the one or more parameters for GUL transmission, wherein the GUL transmission comprises information corresponding to the acquired MCOT.

18. The method of claim 17,
wherein the one or more GUL subframes of the acquired MCOT are reserved subframes that overlap with at least one of a Discovery Reference Signal (DRS) window and a Physical Random Access Channel (PRACH).

19. The method of claim 17,
wherein the GUL transmission comprises a sharing indicator having a value selected from:
a first value indicating that a subframe N+2 can be shared, and that a remaining portion of the acquired MCOT starting from subframe N+2 comprises 8 subframes;
a second value indicating that the subframe N+2 can be shared, and that the remaining portion of the acquired MCOT starting from subframe N+2 comprises 7 subframes;
a third value indicating that the subframe N+2 can be shared, and that the remaining portion of the acquired MCOT starting from subframe N+2 comprises 6 subframes;
a fourth value indicating that the subframe N+2 can be shared, and that the remaining portion of the acquired MCOT starting from subframe N+2 comprises 5 subframes;
a fifth value indicating that the subframe N+2 can be shared, and that the remaining portion of the acquired MCOT starting from subframe N+2 comprises 4 subframes;
a sixth value indicating that the subframe N+2 can be shared, and that the remaining portion of the acquired MCOT starting from subframe N+2 comprises 3 subframes;
a seventh value indicating that the subframe N+2 can be shared, and that the remaining portion of the acquired MCOT starting from subframe N+2 comprises 2 subframes; and
an eighth value indicating that the remaining portion of the acquired MCOT starting from subframe N+2 cannot be shared.

20. The method of claim 19, further comprising generating a Grantless Uplink Control Information (G-UCI) transmission carrying the sharing indicator.

21. The method of claim 17,
wherein GUL transmission comprise at least one of: a first indicator of a number of GUL subframes before an ending of a burst;
and a second indicator for a number of GUL subframes that can be shared with the BS.

22. The method of claim 17,
wherein the GUL transmission comprises a joint indicator of both a number of GUL subframes before an ending of a burst and a number of GUL subframes that can be shared with the BS.

23. The method of claim 18, wherein the GUL transmission is generated in one or more subframes outside the reserved subframes and continues within the DRS window after presence of a DRS is detected.

* * * * *